(12) United States Patent
Nishio

(10) Patent No.: US 11,630,621 B2
(45) Date of Patent: Apr. 18, 2023

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Taku Nishio, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/553,648

(22) Filed: Aug. 28, 2019

(65) Prior Publication Data
US 2020/0081667 A1 Mar. 12, 2020

(30) Foreign Application Priority Data
Sep. 11, 2018 (JP) .............................. JP2018-169602

(51) Int. Cl.
G06F 3/12 (2006.01)
H04N 1/00 (2006.01)
G06K 15/02 (2006.01)

(52) U.S. Cl.
CPC .......... *G06F 3/1243* (2013.01); *G06F 3/1206* (2013.01); *G06F 3/1262* (2013.01); *H04N 1/0092* (2013.01)

(58) Field of Classification Search
None
See application file for complete search history.

(56) References Cited

U.S. PATENT DOCUMENTS

| | | | |
|---|---|---|---|
| 2004/0000246 A1* | 1/2004 | Keane | G06F 3/1205 101/483 |
| 2004/0218217 A1* | 11/2004 | Dechamps | G06Q 10/043 358/1.18 |
| 2004/0252340 A1* | 12/2004 | Komagamine | H04N 1/3875 358/1.18 |
| 2007/0201045 A1* | 8/2007 | Morales | G06F 3/1242 358/1.15 |
| 2007/0253029 A1* | 11/2007 | Yamaguchi | G06F 40/114 358/1.18 |
| 2009/0033978 A1* | 2/2009 | Morales | G06F 3/1206 358/1.15 |
| 2011/0069329 A1* | 3/2011 | Abe | G06F 3/1219 358/1.9 |
| 2019/0073170 A1* | 3/2019 | Suzuki | H04N 1/00639 |

FOREIGN PATENT DOCUMENTS

| | | |
|---|---|---|
| JP | 2011-067960 A | 4/2011 |
| JP | 2017-104986 A | 6/2017 |

OTHER PUBLICATIONS

Jul. 5, 2022 Office Action issued in Japanese Patent Application No. 2018-169602.

* cited by examiner

Primary Examiner — Beniyam Menberu
(74) Attorney, Agent, or Firm — Oliff PLC

(57) ABSTRACT

An information processing apparatus includes a selector and a sender. The selector receives plural print jobs and selects, from among templates applicable to a printer, a template to which each of the plural print jobs is allocated in accordance with a paper size specified in a corresponding print job and a size of continuous-form paper set in the printer. The sender allocates the plural print jobs to the corresponding templates selected by the selector, integrates some of the print jobs together, and then sends an integrated print job to the printer.

11 Claims, 25 Drawing Sheets

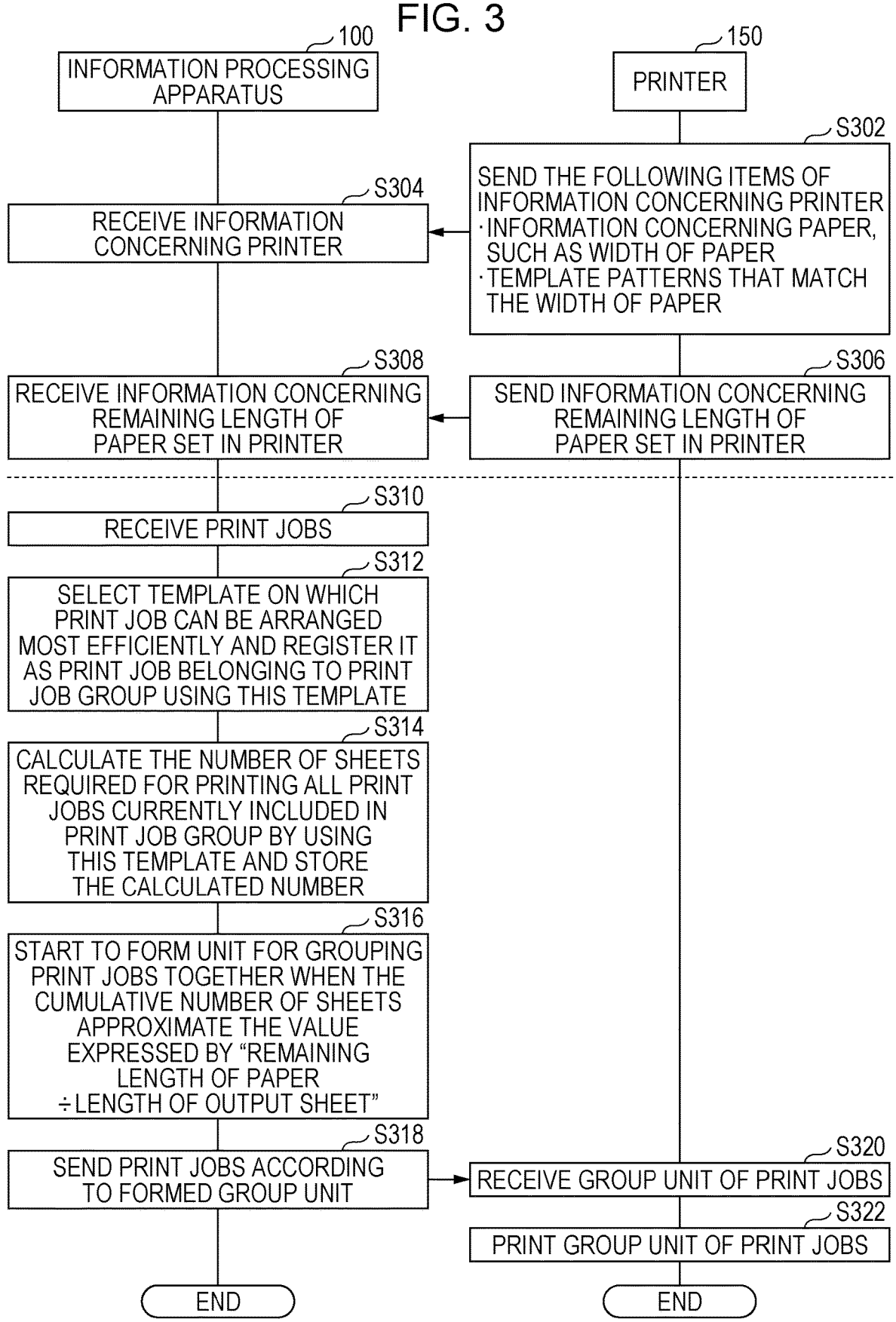

FIG. 19

| ID | Job name | Status | Number of print copies | Number of pages | Total number of pages | Double-sided/ single-sided printing | Sending printer |
|---|---|---|---|---|---|---|---|
| 55 | ▶ 1500 m use-up group (14 jobs) | Waiting | | | 8320 | Single side | |
| 52 | ▶ One page 3000 sheets (4 jobs) | Waiting | | | 3000 | Single side | Continuous-form paper printer |
| 48 | A3Land_09P_1 | Waiting | 100 | 9 | 900 | Single side | Continuous-form paper printer |
| 49 | A3Land_09P_2 | Waiting | 100 | 9 | 900 | Single side | Continuous-form paper printer |
| 50 | A3Land_03P | Waiting | 100 | 3 | 300 | Single side | Continuous-form paper printer |
| 51 | A3Land_09P_3 | Waiting | 100 | 9 | 900 | Single side | Continuous-form paper printer |
| 53 | ▶ Two pages 1400 sheets (5 jobs) | Waiting | | | 2800 | Single side | |
| 3 | A4Port_02P | Waiting | 200 | 2 | 400 | Single side | Continuous-form paper printer |
| 44 | A4Port_03P | Waiting | 100 | 3 | 300 | Single side | Continuous-form paper printer |
| 45 | A4Port_09P | Waiting | 100 | 9 | 900 | Single side | Continuous-form paper printer |
| 46 | A4Port_09P_2 | Waiting | 100 | 9 | 900 | Single side | Continuous-form paper printer |
| 47 | A4Port_03P_2 | Waiting | 100 | 3 | 300 | Single side | Continuous-form paper printer |
| 54 | ▶ Four pages 630 sheets (5 jobs) | Waiting | | | 2520 | Single side | |
| 39 | A5Port_09P | Waiting | 50 | 9 | 450 | Single side | Continuous-form paper printer |
| 40 | A5Port_09P_2 | Waiting | 50 | 9 | 450 | Single side | Continuous-form paper printer |
| 41 | A5Port_03P | Waiting | 90 | 3 | 270 | Single side | Continuous-form paper printer |
| 42 | A5Port_09P_3 | Waiting | 75 | 9 | 675 | Single side | Continuous-form paper printer |
| 43 | A5Port_09P_4 | Waiting | 75 | 9 | 675 | Single side | Continuous-form paper printer |

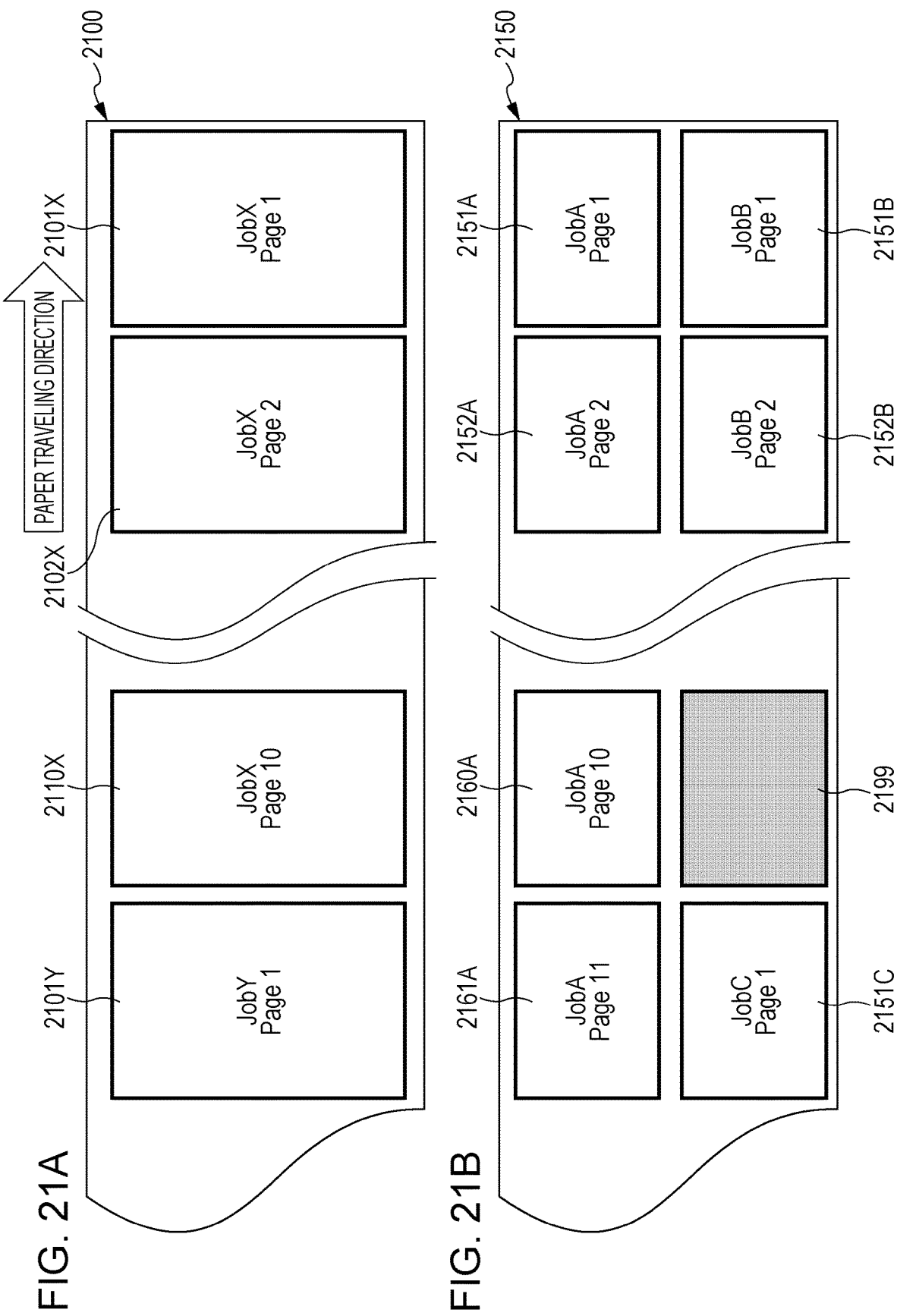

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-169602 filed Sep. 11, 2018.

BACKGROUND

(i) Technical Field

The present disclosure relates to an information processing apparatus and a non-transitory computer readable medium.

(ii) Related Art

Japanese Unexamined Patent Application Publication No. 2017-104986 discloses the following technology to enhance easy grouping of printed cut sheets after performing imposition printing (gang-run printing) in which multiple print jobs are arranged on the same piece of paper. A controller (image processing apparatus) receives print jobs and generates print image data indicating an image to be printed by an image forming device (engine), based on the print jobs. The controller includes a determining unit and an imposition unit. The determining unit extracts multiple print jobs to be arranged together on the same sheet from among the received print jobs, and also determines an imposition printing pattern, based on the multiple print jobs (the number of pages). The imposition unit generates print image data indicating page images of the print jobs, cutting lines representing the positions of a sheet to be cut by a cutter, and identification marks for identifying the positions of the page images on the sheet. The imposition unit then outputs the generated print image data to the engine. The imposition unit disposes at least one identification mark on a cutting line in each of the vertical and horizontal directions, based on the imposition printing pattern determined by the determining unit. Imposition printing makes it possible to arrange and print multiple print jobs of different clients or different types of printed matter on the same sheet or the plate (using ink) and to cut the sheet according to the print jobs. Arranging more print jobs on the same sheet can reduce the cost to be lower.

SUMMARY

Among different types of printers, one type of printer prints on continuous-form paper based on print jobs. The replacement of continuous-form paper in this type of printer is not easy and time-consuming. Additionally, every time printing is performed, a waste of paper incurs immediately after printing is started and immediately before printing is finished. To reduce the frequency of the replacement of continuous-form paper and a waste of paper, multiple print jobs are grouped together and printed at one time of printing. However, a template is selected for each print job, and a template for a group of multiple print jobs is not available.

Aspects of non-limiting embodiments of the present disclosure relate to an information processing apparatus and a non-transitory computer readable medium in which, when sending multiple print jobs to a printer which prints on continuous-form paper, a template can be selected in accordance with the size of continuous-form paper set in the printer.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a selector and a sender. The selector receives plural print jobs, and selects, from among templates applicable to a printer, a template to which each of the plural print jobs is allocated in accordance with a paper size specified in a corresponding print job and a size of continuous-form paper set in the printer. The sender allocates the plural print jobs to the corresponding templates selected by the selector, integrates some of the print jobs together, and then sends an integrated print job to the printer.

BRIEF DESCRIPTION OF THE DRAWINGS

An exemplary embodiment of the present disclosure will be described in detail based on the following figures, wherein:

FIG. 3 is a flowchart illustrating an example of processing executed by the exemplary embodiment;

FIG. 19 illustrates a display example of a print job table according to the exemplary embodiment;

FIGS. 21A and 21B illustrate an example of processing executed by the exemplary embodiment;

DETAILED DESCRIPTION

An exemplary embodiment of the disclosure will be described below with reference to the accompanying drawings.

Figure 1:
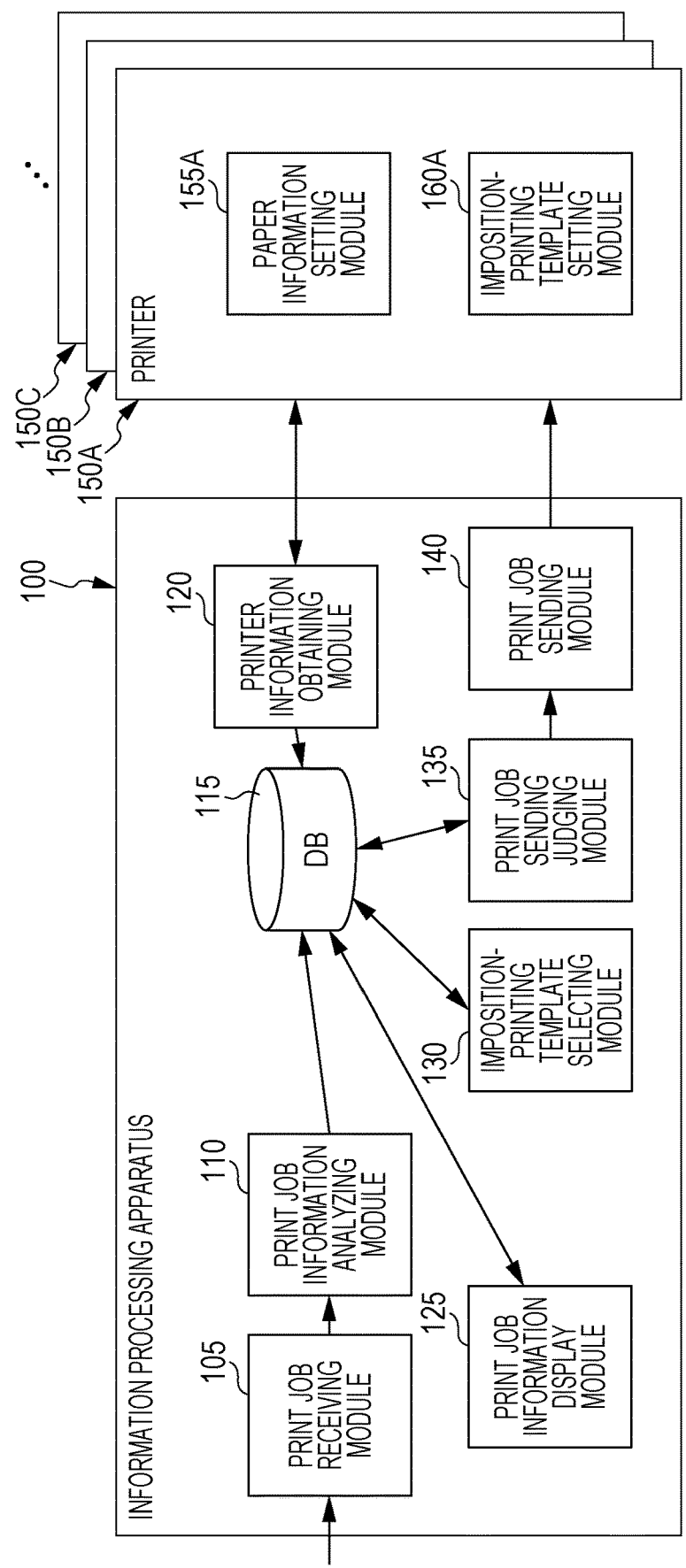
FIG. 1 is a block diagram illustrating conceptual modules forming an example of the configuration of the exemplary embodiment.

FIG. 1 is a block diagram illustrating conceptual modules forming an example of the configuration of the exemplary embodiment.

Generally, modules are software (computer programs) components or hardware components that can be logically separated from one another. The modules of the exemplary embodiment of the disclosure are, not only modules of a computer program, but also modules of a hardware configuration. Thus, the exemplary embodiment will also be described in the form of a computer program for allowing computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiment relates to a computer program, storing the computer program in a storage device or performing control so that the computer program will be stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, login, etc.). The term "predetermined" means being determined prior to a certain operation, and includes the meaning of being determined prior to a certain operation before starting processing of the exemplary embodiment, and also includes the meaning of being determined prior to a certain operation even after starting processing of the exemplary embodiment, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary. If elements are enumerated, such as "A, B, and C", they are only examples unless otherwise stated, and such enumeration includes the meaning that only one of them (only the element A, for example) is selected.

A system or an apparatus may be implemented by connecting plural computers, hardware units, devices, etc., to one another via a communication medium, such as a network (including communication connection based on a one-to-one correspondence), or may be implemented by a single computer, hardware unit, device, etc. The terms "apparatus" and "system" are used synonymously. The term "system" does not include merely a man-made social "mechanism" (social system).

Additionally, every time an operation is performed by using a corresponding module or every time each of plural operations is performed by using a corresponding module, target information is read from a storage device, and after performing the operation, a processing result is written into the storage device. A description of reading from the storage device before an operation or writing into the storage device after an operation may be omitted. Examples of the storage device may be a hard disk drive, a random access memory (RAM), an external storage medium, a storage device using a communication line, and a register within a central processing unit (CPU).

An information processing apparatus 100 according to the exemplary embodiment serves as a relay device that transfers a print job received from another device or terminal to a printer 150. As shown in the example in FIG. 1, the information processing apparatus 100 includes a print job receiving module 105, a print job information analyzing module 110, a database (DB) (storage module) 115, a printer information obtaining module 120, a print job information display module 125, an imposition-printing template selecting module 130, a print job sending judging module 135, and a print job sending module 140.

The information processing apparatus 100 performs imposition printing (gang-run printing) by using print jobs and information concerning the width of print paper, and also creates an operation group unit which makes it possible to use up the remaining amount of a bundle of paper in the printer 150.

The print job receiving module 105 is connected to the print job information analyzing module 110. The print job receiving module 105 receives plural print jobs from another device or terminal and supplies them to the print job information analyzing module 110. Print jobs received by the print job receiving module 105 are those to be printed by the printer 150.

The print job information analyzing module 110 is connected to the print job receiving module 105 and the DB 115. The print job information analyzing module 110 analyzes print setting information (attribute information) and print data information concerning print jobs received from the print job receiving module 105 and stores the print jobs and the analyzing results in the DB 115.

The DB 115 is connected to the print job information analyzing module 110, the printer information obtaining module 120, the print job information display module 125, the imposition-printing template selecting module 130, and the print job sending judging module 135. The DB 115 stores and manages various items of information such as print job attribute information, print data information, imposition-printing template information, imposition-printing template selection information, and group print job information, and status information concerning the printers 150.

The printer information obtaining module 120 is connected to the DB 115 and the printers 150 (such as printers 150A, 150B, and 150C). The printer information obtaining module 120 regularly requests the printers 150 to send various items of information, such as paper information, imposition-printing template information, and remaining paper amount information, and stores such items of information in the DB 115.

The print job information display module 125 is connected to the DB 115. The print job information display module 125 presents print job attribute information and group print job information, for example, to a user.

The imposition-printing template selecting module 130 is connected to the DB 115. The imposition-printing template selecting module 130 checks attributes of a print job and imposition-printing template information concerning a printer 150 to which the print job will be sent, and selects an imposition printing template suitable for this print job.

The imposition-printing template selecting module 130 also selects a template to which a print job is allocated from among templates applicable to the printer 150, in accordance with the paper size specified in this print job and the size of continuous-form paper set in the printer 150.

Templates applicable to the printer 150 are templates in which settings for imposition printing are set, and may be provided (stored) by the printer 150 or by a controller of the printer 150.

Specifically, the paper size (hereinafter also called the print data page size) is identified by the length and width of a print document indicated by print data (such as a page document format (PDF) data) in a print job.

Specifically, the size of continuous-form paper is identified by the width and the remaining amount (length) of continuous-form paper set in the printer 150.

Templates may be divided into groups in accordance with the width of continuous-form paper, the sheet size in the print direction set in each template, and whether each template is used for single-sided or double-sided printing.

The imposition-printing template selecting module 130 may select a group of templates suitable for the width of continuous-form paper set in the printer 150 and the paper size specified in a corresponding print job, and according to whether single-sided or double-sided printing is specified in the corresponding print job.

A template which is not suitable for the width of continuous-form paper set in the printer 150 (such as the width of an output sheet of a template is greater than that of continuous-form paper set in the printer 150) comes under a group which is not selected.

The sheet size in the print direction is the length of an output sheet.

Examples of a template group are a group of templates having a length X of an output sheet and used for single-sided printing and a group of templates having a length Y of an output sheet and used for double-sided printing.

The imposition-printing template selecting module 130 may select a template group based on the condition that the paper size is smaller than or equal to the largest size of pages of the templates within a group.

The imposition-printing template selecting module 130 may select a template group based on the condition that another print job is already allocated to a template within a group.

The imposition-printing template selecting module 130 may select a template group based on the condition that the value obtained by subtracting the length of the paper size from that of the sheet size in the print direction is 0 or greater and is almost 0.

The length of the sheet size is the sheet size in the print direction. If the above-described value is almost 0, it means that a blank portion along the length of paper is minimized.

The imposition-printing template selecting module 130 may compare the paper size with the page size of each of the templates within the selected group, and select the template within which a blank portion will be the smallest.

If the blank portion is the smallest, a waste of paper is minimized.

The print job sending judging module 135 is connected to the DB 115 and the print job sending module 140. The print job sending judging module 135 compares the remaining amount of paper of the printer 150 to which print jobs will be sent with the amount of paper to be used for stored print jobs, and instructs the print job sending module 140 to send certain print jobs if a predetermined condition is satisfied. In this manner, prior to sending print jobs, the print job sending judging module 135 forms certain print jobs into a group print job.

The print job sending module 140 is connected to the print job sending judging module 135 and the printers 150 (such as the printers 150A, 150B, and 150C). The print sending module 140 sends print jobs included in a group print job that the print job sending module 140 is instructed to send to a printer 150, in accordance with a sending method suitable for the printer 150.

The print job sending module 140 allocates each print job to a corresponding template selected by the imposition-printing template selecting module 130, integrates certain print jobs, and then sends them to the printer 150.

The print job sending module 140 may allocate the plural print jobs to the templates selected by the imposition-printing template selecting module 130 so that the amount of continuous-form paper which remains as a result of printing the print jobs will be smaller than or smaller than or equal to a predetermined value. The print job sending module 140 may then integrate certain print jobs together and send them to the printer 150.

The remaining amount of continuous-form paper may be expressed by the length (unit is meters, for example) of paper or the number of sheets, for example. Calculating the remaining amount of continuous-form paper by the number of sheets will be discussed below.

For each of the print jobs to be allocated to a template selected by the imposition-printing template selecting module 130, the print job sending module 140 may calculate the number of sheets set in the selected template required for printing a corresponding print job, and compare the total number of sheets required for printing plural print jobs in the selected template with the number of printable sheets corresponding to the remaining amount of continuous-form paper set in the printer 150. If the difference between the two numbers of sheets is smaller than or smaller than or equal to a predetermined value, the print job sending module 140 may allocate the print jobs to the selected template, integrate the print jobs together, and send them to the printer 150.

The printers 150 (such as the printers 150A, 150B, and 150C) each include a paper information setting module 155 and an imposition-printing template setting module 160. The printers 150 are each connected to the printer information obtaining module 120 and the print job sending module 140 of the information processing apparatus 100.

Hereinafter, when referring to the printers 150 in general, they may collectively be called the printer 150 unless it is necessary to individually distinguish them from each other.

The printer 150 receives a print job from the print job sending module 140 of the information processing apparatus 100 and performs printing in accordance with the print job. The print job received by the printer 150 is an integrated group of print jobs (more specifically, an integrated group of plural print jobs received by the print job receiving module 105) and has been allocated to a template (may be plural templates) stored in the imposition-printing template setting module 160.

An example of the printer 150 is a production printer. The production printer performs light printing for in-house printing departments of companies and print stores, and usually offers mass printing. The printers 150 are not restricted to production printers, and may be general-purpose printers, such as business printers and home printers.

The printer 150 may not be necessarily able to handle a group print job constituted by multiple print jobs. Even if the printer 150 does not support a group print job, that is, even if it handles only a single print job, it can still handle a group print job if the information processing apparatus 100 sends print jobs forming a group print job to the printer 150 in accordance with the print order of the group print job. That is, it is possible to handle a group print job by using both of the information processing apparatus 100 and the printer 150.

The printer 150 is also called a continuous-form-paper printer. Examples of the continuous-form paper are roll paper, line printer (LP) paper, and continuous paper.

Although three printers 150 are shown in the example in FIG. 1, one printer 150 may be provided or any plural printers 150 may be provided.

The paper information setting module 155 detects information concerning continuous-form paper set in the printer 150 and supplies the information to the printer information obtaining module 120 of the information processing apparatus 100. Examples of information concerning continuous-form paper are the width and the remaining amount of continuous-form paper.

The imposition-printing template setting module 160 stores templates applicable to the printer 150, and supplies information concerning these templates to the printer information obtaining module 120 of the information processing apparatus 100.

Figure 2A:
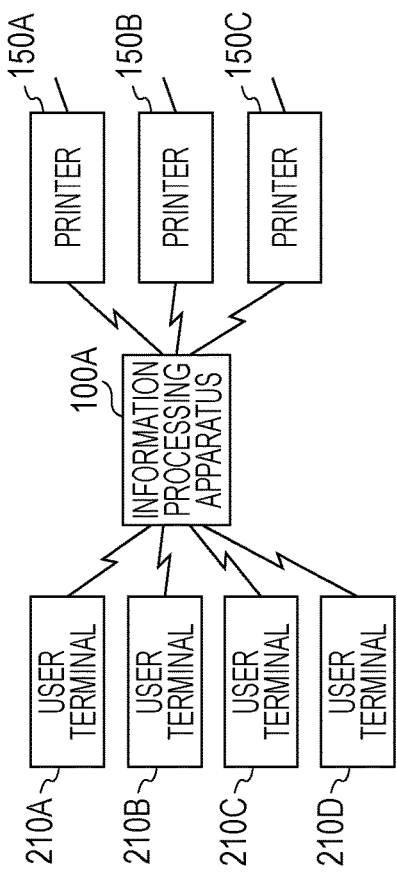
FIGS. 2A and 2B illustrate examples of the system configuration utilizing the exemplary embodiment.
Figure 2B:
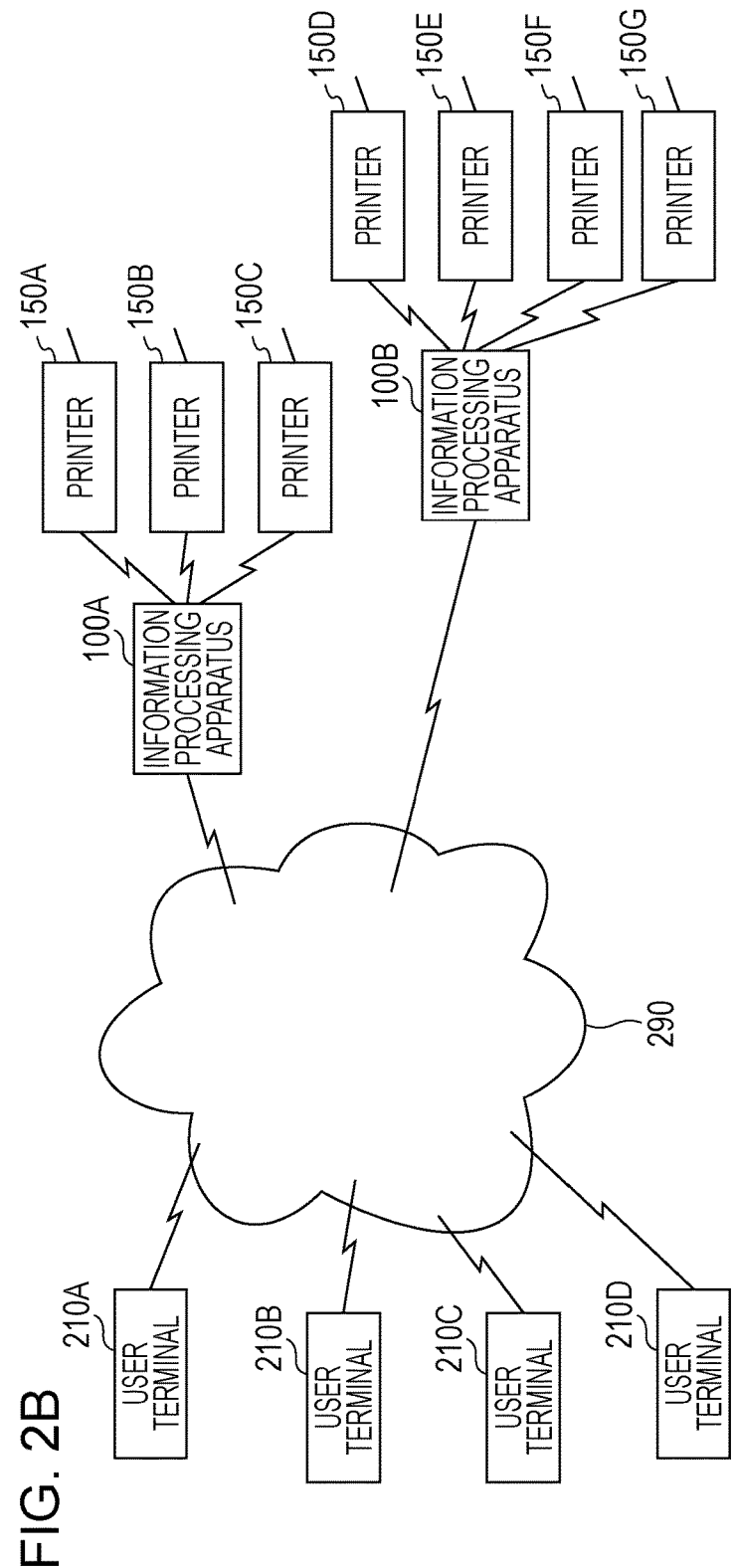

FIGS. 2A and 2B illustrate examples of the system configuration utilizing the exemplary embodiment.

The information processing apparatus 100 may be included within an external controller of the printer 150.

In the example shown in FIG. 2A, an information processing apparatus 100A is connected to user terminals 210 (user terminals 210A through 210D) and printers 150 (printers 150A through 150C).

Hereinafter, when referring to the user terminals 210 in general, they may collectively be called the user terminal 210 unless it is necessary to individually distinguish them from each other.

The information processing apparatus 100A receives a print job or a group print job from the user terminal 210 and supplies it to the printer 150 suitable for the received print job or group print job. The printer 150 performs print processing in accordance with the received print job or group print job.

In the example in FIG. 2B, information processing apparatuses 100A and 100B and user terminals 210A through 210D are connected to each other via a communication line 290. The communication line 290 may be a wireless or wired medium, or a combination thereof, and may be, for example, the Internet or an intranet as a communication infrastructure. The functions of the information processing apparatuses 100A and 100B may be implemented as cloud services.

The information processing apparatus 100A is connected to printers 150A through 150C.

The information processing apparatus 100B is connected to printers 150D through 150G.

Hereinafter, when referring to the information processing apparatuses 100 in general, they may collectively be called the information processing apparatus 100 unless it is necessary to individually distinguish them from each other.

The information processing apparatus 100 receives a print job or a group print job from the user terminal 210 via the communication line 290 and supplies it to the printer 150 suitable for the received print job or group print job. The printer 150 performs print processing in accordance with the received print job or group print job.

In the related art, the above-described information processing apparatus 100 is not used for controlling printers. The situation of the related art as follows.

Print jobs used in a printing operation are print units divided into small tasks. To respond to market needs, it is still desirable to group print jobs into a unit in a desirable order so that operations after printing (postprocessing, envelope enclosing and sealing, packing, and shipping) can efficiently be performed.

In the printing operation using a printer handling continuous-form paper (also called a continuous-form-paper printer), the replacement of a bundle of paper (such as roll paper) set in a continuous-form-paper printer is not easy and decreases the operation efficiency, and because of the structure of a continuous-form-paper printer, a waste of paper incurs immediately after printing is started and immediately before printing is finished. It is thus desirable to group print jobs together to a unit which makes it possible to use up a bundle of paper set in a continuous-form-paper printer at one time of printing operation.

A controller of a continuous-form-paper printer can define multiple imposition printing templates and perform control so that printing processing can continuously be executed even for different templates if the templates have the same size in the print direction on one print side.

It is however difficult to group print jobs together to a unit which makes it possible to use up the remaining amount of a bundle of paper while plural print jobs can efficiently be arranged for imposition printing. It is also desirable to group print jobs together into a unit which makes it possible to enhance the efficiency of postprocessing (such as cutting).

In view of this background, the information processing apparatus 100 according to the exemplary embodiment executes the following processing, for example.

The information processing apparatus 100 obtains the following items of information from the printer 150: information concerning the width of a bundle of paper and the remaining length of paper currently set in the printer 150; and information concerning imposition printing templates applicable to the printer 150.

The information processing apparatus 100 selects a template on which a print job to be sent to a subject printer 150 can efficiently be arranged, and calculates the length of paper to be used by the print job. The information processing apparatus 100 then stores information that this print job belongs to a print job group using this template.

For example, at a timing at which the total length of paper to be used by print jobs included in this group becomes close to the remaining amount of paper set in the printer 150, the information processing apparatus 100 forms a group unit for these print jobs.

FIG. 3 is a flowchart illustrating an example of processing executed by the exemplary embodiment.

Steps S302 through S308 are preprocessing. The printer information obtaining module 120 of the information processing apparatus 100 obtains information concerning the printer 150. The printer information obtaining module 120 may obtain such information on a regular basis or before the information processing apparatus 100 sends print jobs to the printer 150.

In step S302, the printer 150 sends the following items of information concerning the printer 150.

Information concerning a bundle of paper set in the printer 150, such as the width of paper Imposition-printing template patterns that match the width of paper set in the printer 150

In step S304, the information processing apparatus 100 stores the information received from the printer 150 in the DB 115.

In step S306, the printer 150 sends information concerning the remaining length of paper set in the printer 150 to the information processing apparatus 100.

In step S308, the information processing apparatus 100 receives the informal on concerning the remaining length of paper and stores it in the DB 115.

In step S310, the information processing apparatus 100 receives plural print jobs from one user terminal 210 or from plural user terminals 120.

In step S312, for each of the plural print jobs, the information processing apparatus 100 selects a template on which a print job can be arranged most efficiently, based on the vertical size and the horizontal size of print job data and setting information concerning the templates, and registers this print job as a print job belonging to a print job group (group print job) using this template. "Print job can be arranged most efficiently" means that the blank portion of paper can be reduced, and this does not necessarily mean that the blank portion is minimized.

In step S314, the information processing apparatus 100 calculates the number of sheets (rounding up to the closest whole number) required for printing all the print jobs currently included in the print job group by using the template, and stores the calculated number.

In step S316, at a timing at which the cumulative number of sheets of this template or a group of templates that can be used together approximates the value expressed by "the remaining length of paper÷the length of the output sheet", the information processing apparatus 100 starts to form a unit for grouping print jobs together.

In step S318, the information processing apparatus 100 sends print jobs according to the formed unit (group unit).

In step S320, the printer 150 receives a group unit of print jobs.

In step S322, the printer 150 prints a group unit of print jobs.

The print job information display module 125 of the information processing apparatus 100 displays information obtained from the printer 150 on a display. Display examples of the information will be described below with reference to FIGS. 4 through 6. Instead of the print job information display module 125, the printer 150 may display information on a display of the printer 150.

Figure 4:
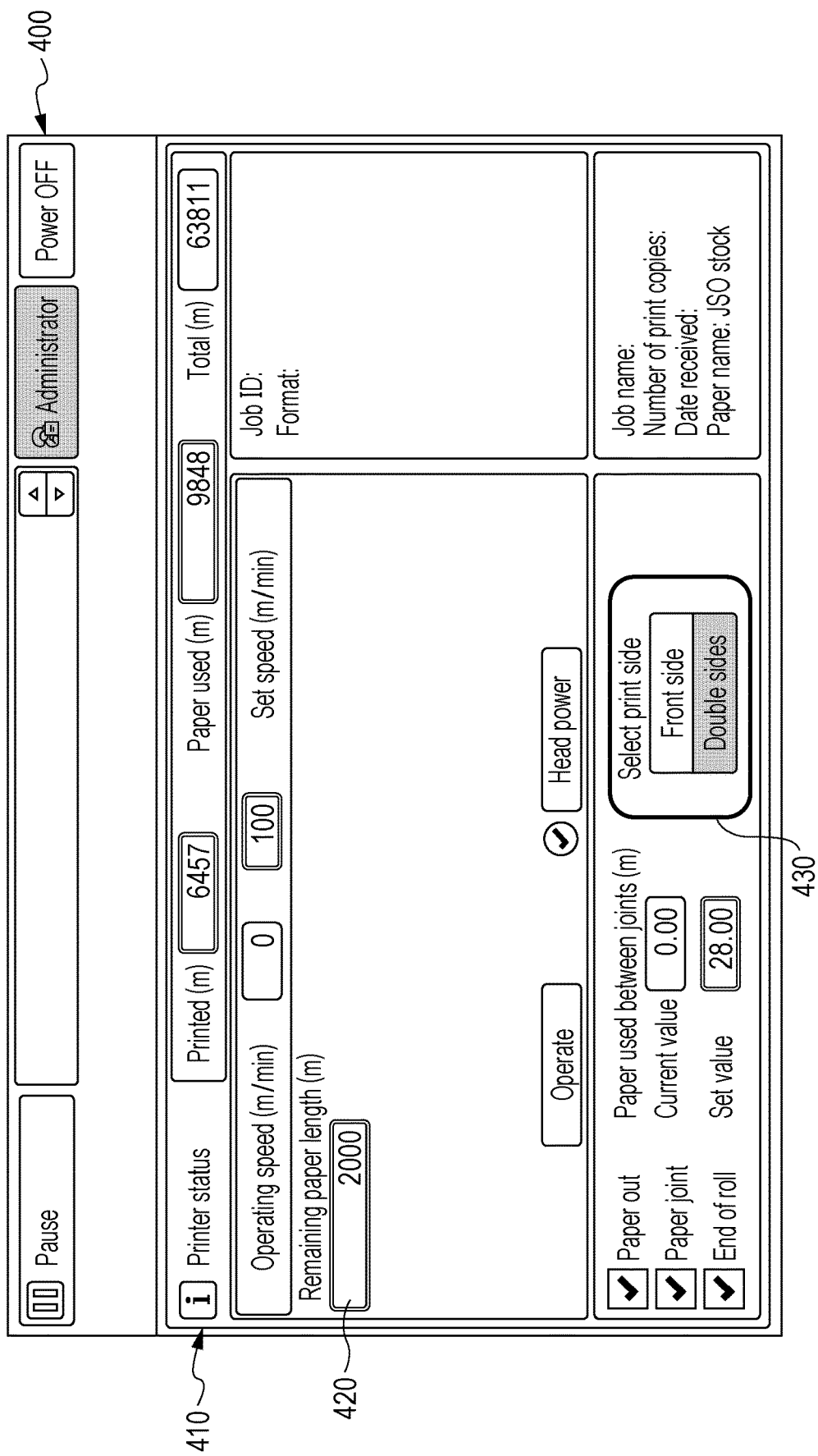
FIG. 4 illustrates an example of processing executed by the exemplary embodiment.

FIG. 4 illustrates an example of processing executed by the exemplary embodiment.

On a screen 400, a printer status display region 410 is displayed.

The printer status display region 410 includes a remaining paper length display field 420 and a double-sided/single-sided printing setting field 430. The remaining paper length display field 420 indicates the remaining amount of paper currently set in the printer 150. Paper is continuous-form paper, and the remaining amount is expressed by the length (unit is meters, for example). The double-sided/single-sided printing setting field 430 indicates the print side used in the printer 150, that is, whether a front side (single side) or double sides is used for printing. This information may be used for the imposition-printing template selecting module 130 to select a template. In addition to the remaining paper length and the print side, the operating print speed and the set print speed may be displayed.

Figure 5:
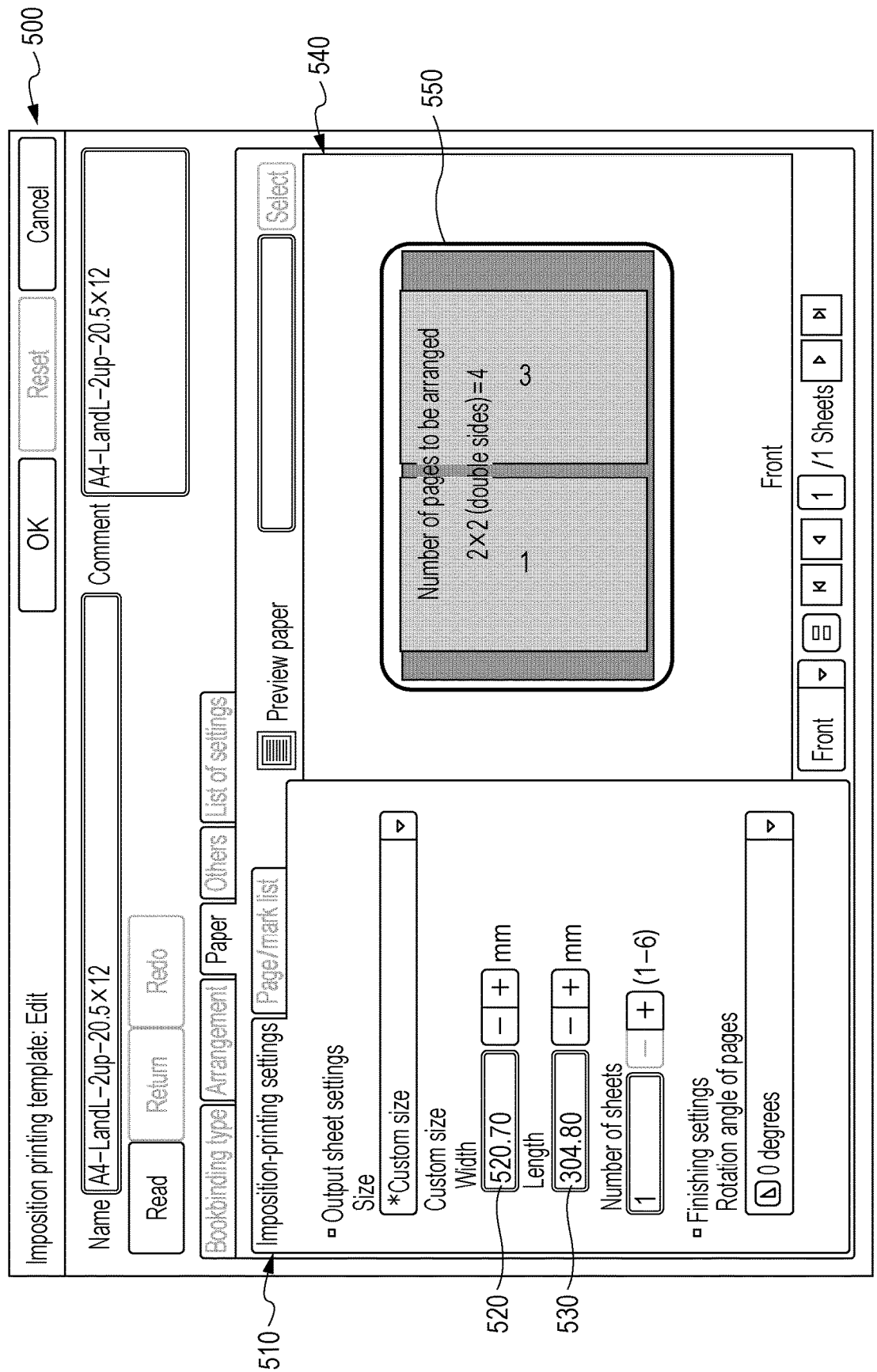
FIG. 5 illustrates an example of processing executed by the exemplary embodiment.

FIG. 5 illustrates an example of processing executed by the exemplary embodiment.

On a screen 500, an imposition printing setting region 510 is displayed. In the imposition printing setting region 510, information required for the printer 150 to set imposition printing settings is displayed.

The imposition printing setting region 510 includes an output sheet width setting field 520, an output sheet length setting field 530, and an imposition printing template preview area 540. The output sheet width setting field 520 indicates the width of an output sheet. The output sheet length setting field 530 indicates the length of an output sheet. In the imposition printing template preview area 540, the image of print jobs arranged on a template is displayed. An imposition printing template has the following items of information.

Single-sided or double-sided printing
Output sheet size
Number of pages of template
Page size of template Templates having the same value in the output sheet length setting field 530 may be used together at one time of printing operation. Although details of imposition printing templates will be discussed later, plural templates are provided and some of them have the same output sheet length and can be used together. An output sheet will be discussed later with reference to FIG. 7.

In the imposition printing template preview area 540, a template image 550 is displayed. In the example in FIG. 5, the total number of pages (also called imposition printing pages) of a template on front and back sides is four, and two pages are arranged on the front side (the first page on the left side and the third page is the right side).

Figure 6:
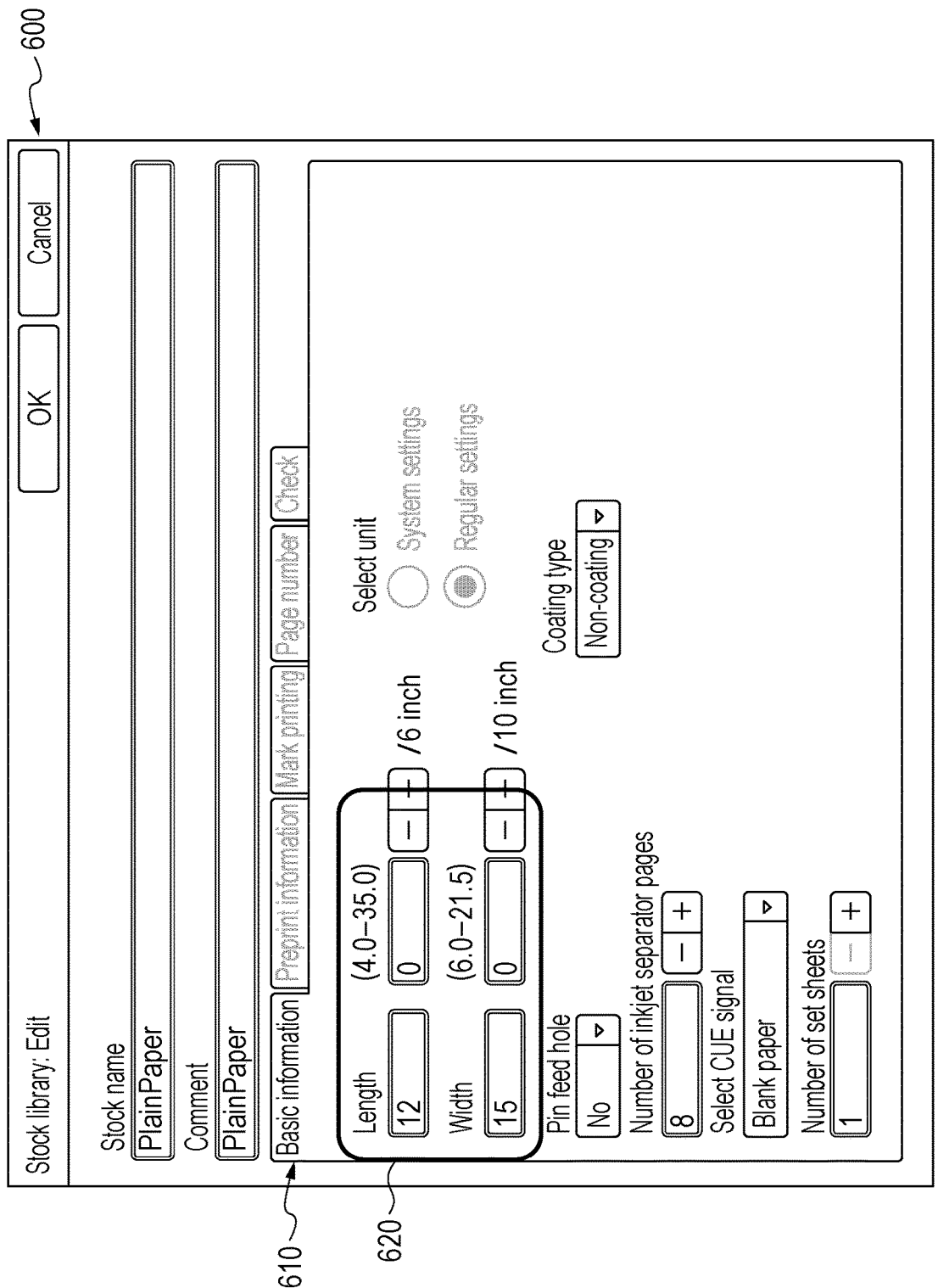
FIG. 6 illustrates an example of processing executed by the exemplary embodiment.

FIG. 6 illustrates an example of processing executed by the exemplary embodiment.

On a screen 600, a set-paper basic information display region 610 is displayed.

In the set-paper basic information display region 610, a paper size display area 620 is displayed. In the paper size display area 620, the size (length and width) of paper currently set in the printer 150 is displayed.

Figure 7:
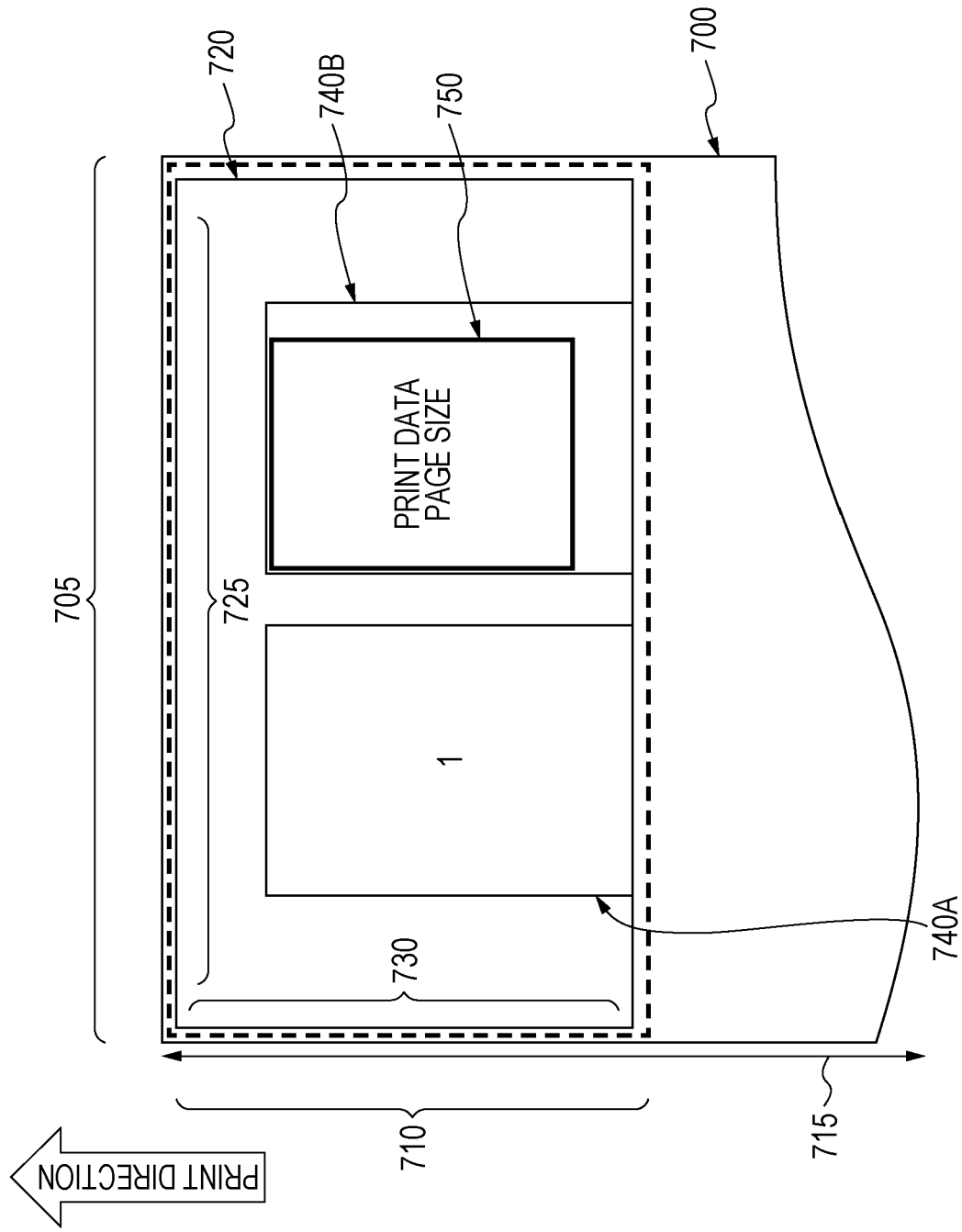
FIG. 7 is an illustration for explaining an example of the definition of a sheet handled in the exemplary embodiment.

FIG. 7 is an illustration for explaining an example of the definition of a sheet handled in the exemplary embodiment.

Paper 700 is continuous-form paper. As shown in the example in FIG. 7, the upward direction is the print direction.

One unit of paper determined by a paper width 705 and a paper length 710 is a region containing an output sheet 720. Although one unit of paper may be the same size as the output sheet 720, it is usually set to be larger than the output sheet 720. That is, within one unit of paper, the output sheet 720 and a margin around the output sheet 720 are contained.

The paper width 705 is the width of one unit of paper, and is also the width of continuous-form paper. The paper length 710 is the length of one unit of paper. The length of continuous-form paper is equal to a remaining paper length 715.

The output sheet 720 is used for setting imposition printing pages and also serves as an imposition printing template. The size of the output sheet 720 is determined by an output sheet width 725 and an output sheet length 730. Within the output sheet 720, imposition printing pages, such as pages 740A and 740B, are set. More specifically, imposition printing pages are set by the number of pages 740 in the output sheet 720 and the positions (XY coordinates on the top left corner, for example) and the length and width of each of the pages 740.

The page 740 is an area where print data (PDF data, for example) of a print job is printed. That is, a print data page 750 is disposed within each page 740. The size of the print data page 750 is the size of print data of a print job. The print data page 750 may be arranged at a predetermined position within the page 740 (for example, a position determined by fitting the top left corner of the print data page 750 with that of the page 740), or may be set by a user operation.

Different templates having the same length of the output sheet 720 (output sheet length 730) may be used together at one time of printing operation. For example, templates having different number of pages 740 within the output sheet 720 or templates having different sizes of the pages 740 may be used together at one time of printing if the paper length 710 and the paper width 705 are the same.

Figure 8:
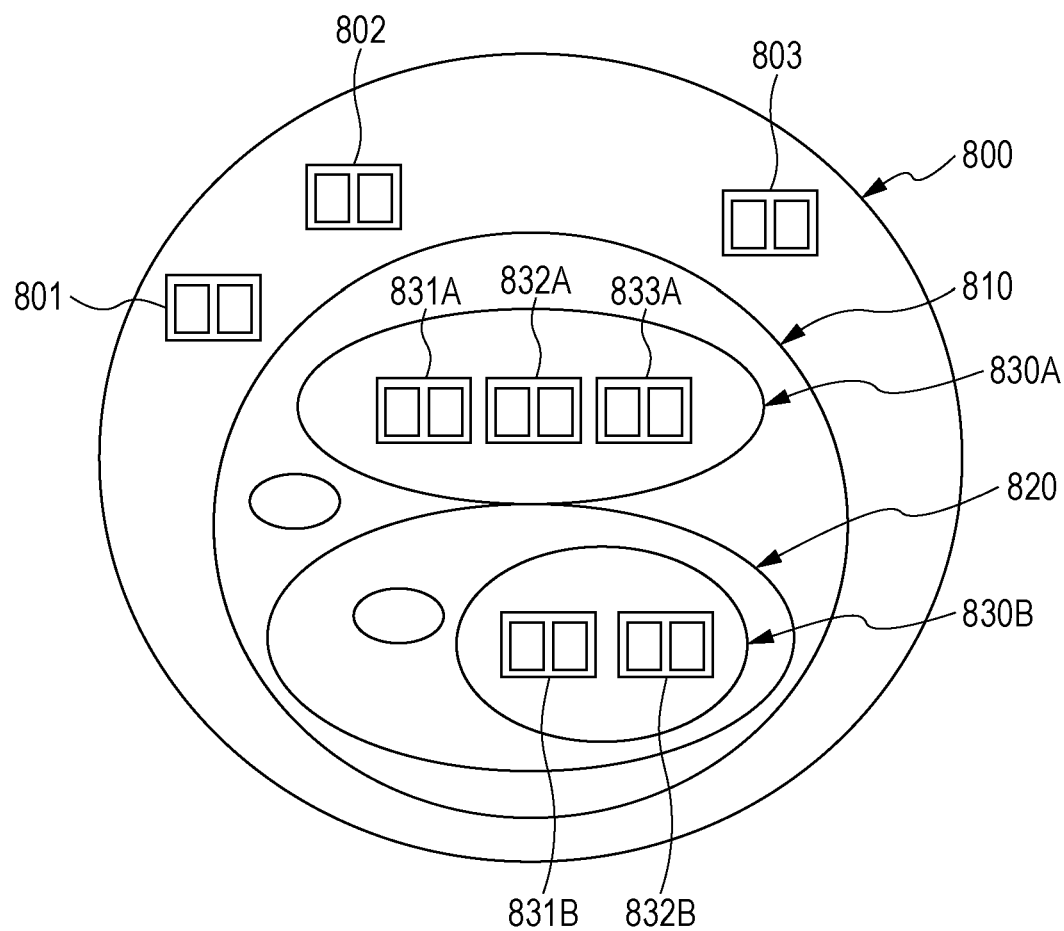
FIG. 8 is an illustration for explaining an example of the relationships among imposition printing template groups.

FIG. 8 is an illustration for explaining an example of the relationships among imposition printing template groups.

A group 800 is a group of all templates registered in the printer 150.

A group 810 is a group of templates which are currently applicable to the printer 150. The condition that templates are included in the group 810 is that the sizes (widths) of output sheets of templates are smaller than or equal to the size (width) of paper currently set in the printer 150. Templates 801, 802, and 803 that do not fit the size of paper set in the printer 150 are excluded from the group 810.

The group 810 includes groups 820 and 830.

The group 820 is a group of templates that can be currently used for printing. The conditions that templates are included in the group 820 are that (1) they are currently applicable to the printer 150 (that is, they are included in the group 810) and (2) the setting concerning the print side (single-sided or double-sided printing) is the same as that in the printer 150.

The group 830 is a group of templates that can be used together at one time of printing operation. The conditions that templates are included in the group 830 are that (1) they are currently applicable to the printer 150 (that is, they are included in the group 810) and (2) the lengths of the output sheets are the same.

There may be a case in which the group 830 (group 830A) is not included in the group 820 and a case in which the group 830 (group 830B) is included in the group 820.

Figure 9:
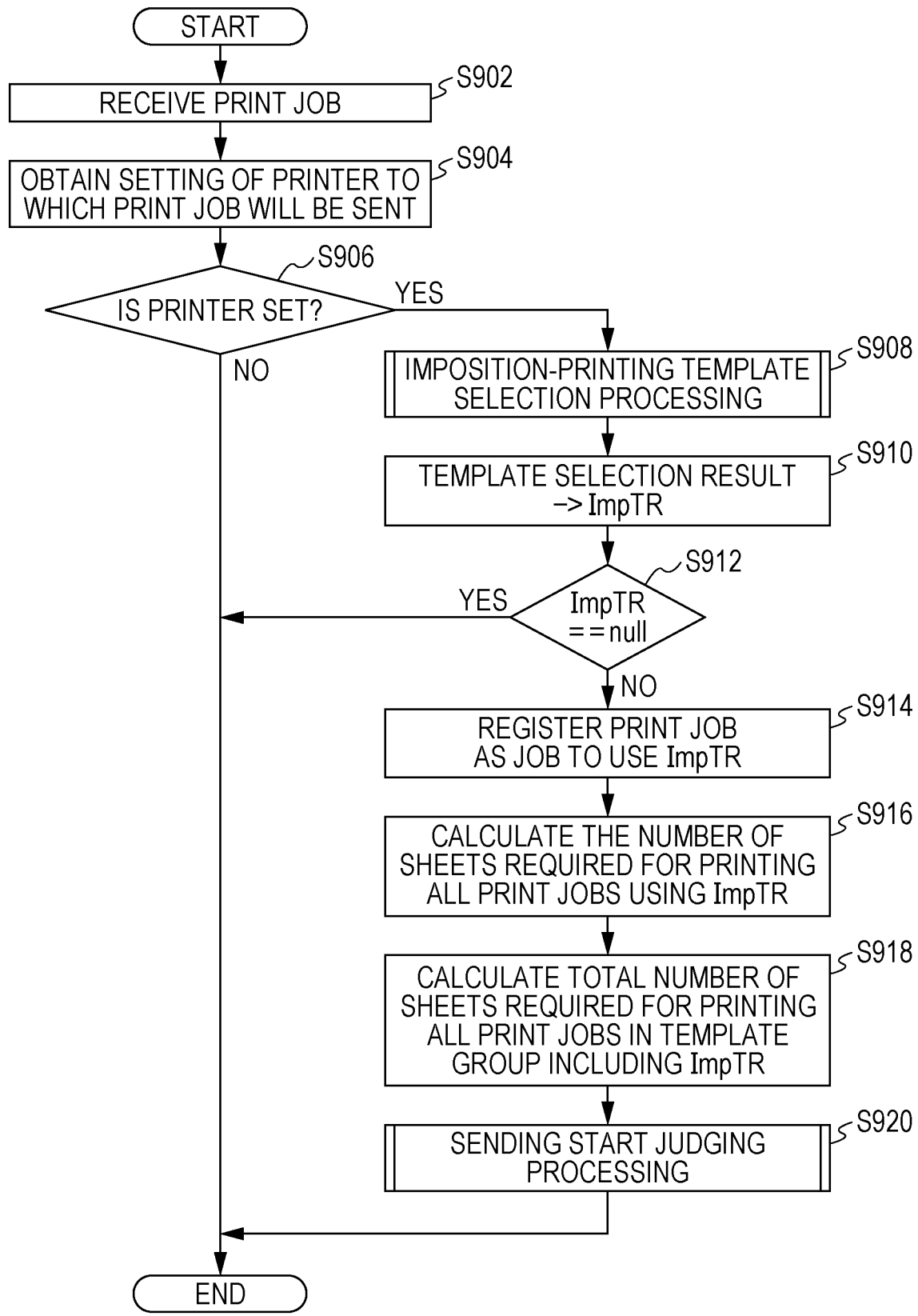
FIG. 9 is a flowchart illustrating an example of processing executed by the exemplary embodiment.

FIG. 9 is a flowchart illustrating an example of processing executed by the exemplary embodiment.

In step S902, a print job is received.

In step S904, the setting of a printer 150 to which the print job will be sent (printer 150 which performs printing in accordance with this print job) is obtained. If a printer 150 is specified in the print job, it is extracted. A predetermined printer 150 may alternatively be set.

In step S906, it is judged whether a printer 150 is set. If a printer 150 is not set, the processing is terminated. If a printer 150 is set, the process proceeds to step S908.

In step S908, imposition-printing template selection processing is executed. Details of step S908 will be discussed later with reference to the flowchart of FIG. 10.

In step S910, an imposition printing template is selected. The selection result is input into a variable "ImpTR". ImpTR is a variable representing an identifier of an imposition printing template.

In step S912, it is judged whether the selecting of an imposition printing template has failed ("ImpTR==null"). In the case of "ImpTR==null", the processing is terminated. If a template has been selected, the process proceeds to step S914.

In step S914, the print job is registered as a print job to use the template ImpTR.

In step S916, the number of sheets required for printing all print jobs of a print job group using the template ImpTR is calculated.

In step S918, the total number of sheets requited for printing all print jobs in a template group including the template ImpTR is calculated. Details of steps S916 and S918 will be discussed later with reference to FIGS. 18A through 18D.

In step S920, sending start judging processing is executed. Details of step S920 will be discussed later with reference to the flowchart of FIG. 13.

Figure 10:
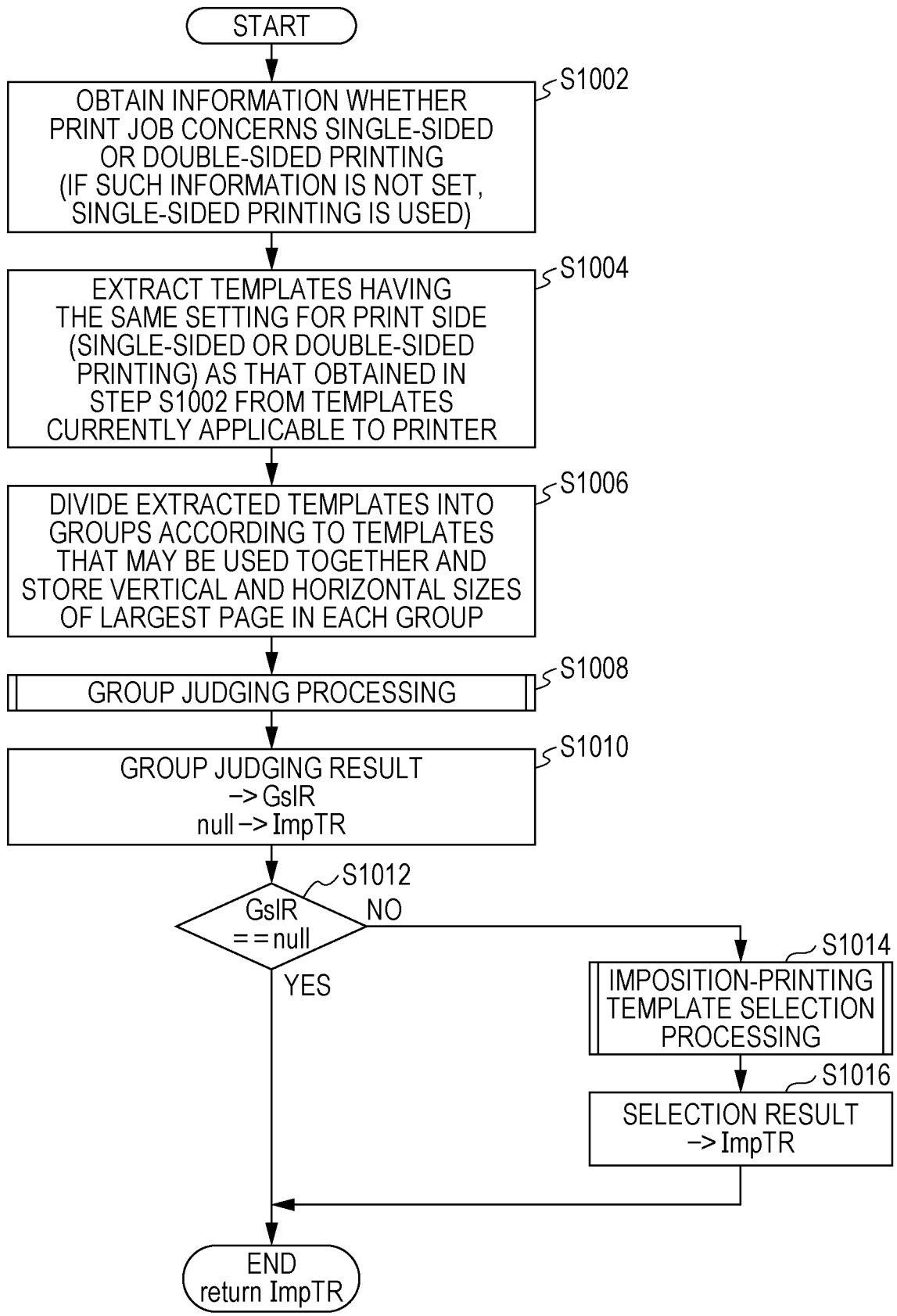
FIG. 10 is a flowchart illustrating an example of processing executed by the exemplary embodiment.

FIG. 10 is a flowchart illustrating an example of processing executed by the exemplary embodiment. More specifically, FIG. 10 illustrates details of an example of imposition-printing template selection processing of step S908 in the flowchart in FIG. 9.

In step S1002, information as to whether a print job concerns single-sided or double-sided printing is obtained. If such information is not set in the print job, single-sided printing may be used as a default.

In step S1004, among imposition printing templates currently applicable to the printer 150 (determined by the size of continuous-form paper set in the printer 150), templates having the same setting concerning the print side (single-sided or double-sided printing) as that obtained in step S1002 are extracted.

In step S1006, the extracted templates are divided into groups according to templates that may be used together at one time of printing operation. Among the templates included in each group, the vertical and horizontal sizes of the largest page are stored.

In step S1008, group judging processing is executed. Details of step S1008 will be discussed later with reference to the flowchart of FIG. 11.

In step S1010, the group judging result obtained in step S1008 is input into a variable GslR, and "null" is input into a variable ImpTR.

In step S1012, it is judged whether "GslR==null". If the result of step S1012 is YES, the processing is terminated. If the result of step S1012 is NO, the process proceeds to step S1014.

In step S1014, imposition-printing template selection processing for selecting a template from the selected group is executed. Details of step S1014 will be discussed later with reference to the flowchart of FIG. 12.

In step S1016, the result of selecting a template from the selected group is input into the variable ImpTR.

Then, the processing is completed. As a return value, the variable ImpTR is returned to step S908 in the flowchart of FIG. 9.

Figure 11:
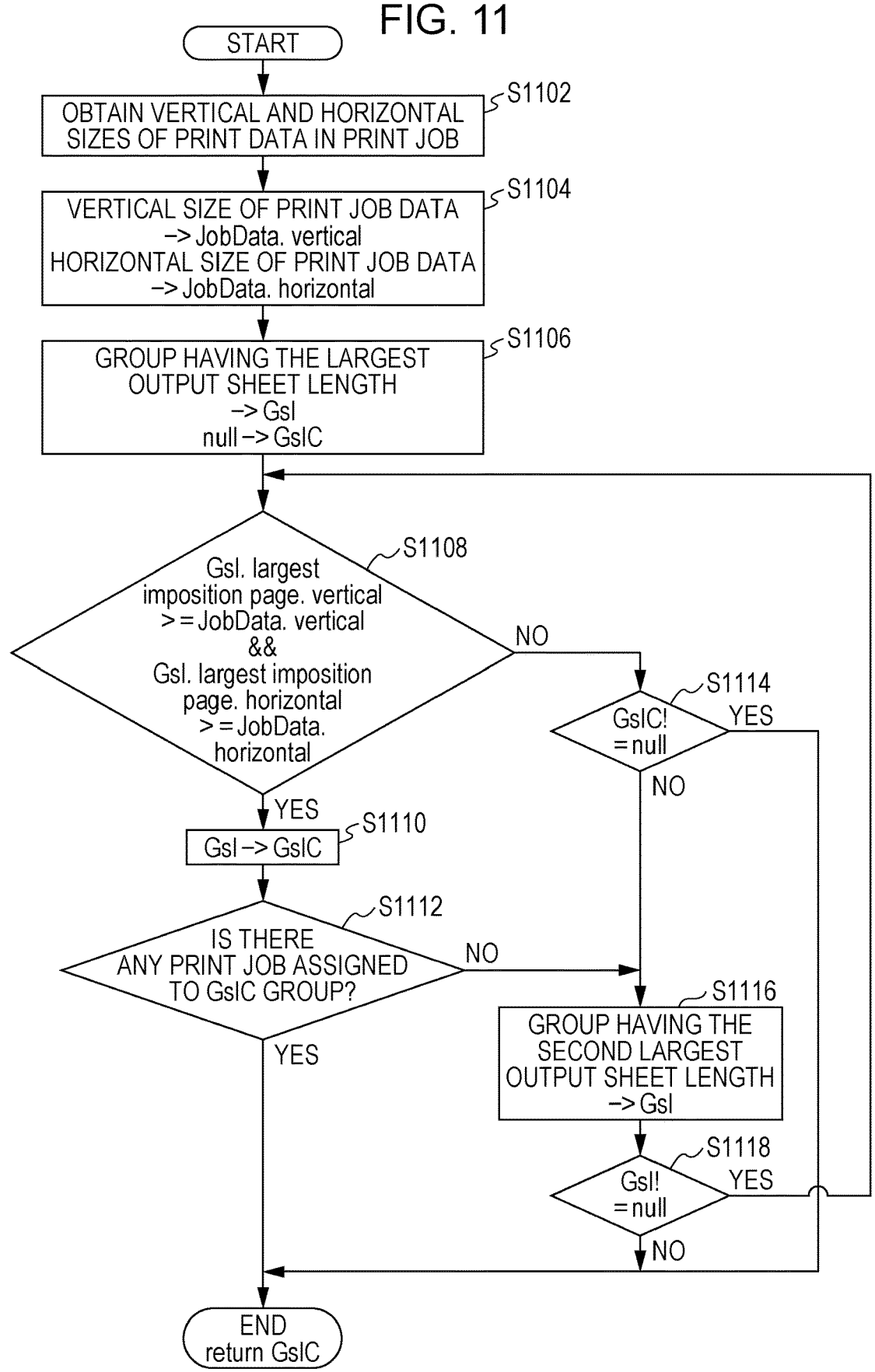
FIG. 11 is a flowchart illustrating an example of processing executed by the exemplary embodiment.

FIG. 11 is a flowchart illustrating an example of processing executed by the exemplary embodiment. More specifically, FIG. 11 illustrates details of an example of group judging processing of step S1008 in the flowchart of FIG. 10.

In step S1102, the vertical and horizontal sizes of the print job data in the print job is obtained.

In step S1104, the vertical size of the print job data is input into a variable "JobData, vertical" and the horizontal size of the print job data is input into a variable "JobData. horizontal".

In step S1106, the group having the largest output sheet length is input into a variable "Gsl", and "null" is input into a variable GslC".

In step S1108, it is judged whether "Gsl. largest imposition page. vertical≥JobData. vertical" and "Gsl. largest imposition page. horizontal≥JobData. horizontal". If the result of step S1108 is YES, the process proceeds to step S1110. If the result of step S1108 is NO, the process proceeds to step S1114.

In step S1110, the value of the variable Gsl is input into the variable GslC.

In step S1112, it is judged whether there is any print job assigned to the GslC group. If there is such a print job, the processing is completed. If no print job is assigned to the GslC group, the process proceeds to step S1116.

In step S1114, it is judged whether "GslC !=null" (variable GslC is not null). If the result of step S1114 is YES, the processing is terminated. If the result of step S1114 is NO, the process proceeds to step S1116.

In step S1116, the group having the second largest output sheet length is input into the variable "Gsl".

In step S1118, it is judged whether "Gsl !=null" (variable Gsl is not null). If the result of step S1118 is YES, the process returns to step S1108. If the result of step S1118 is NO, the processing is terminated. As a return value, the variable GslC is returned to step S1008 in the flowchart of FIG. 10.

Figure 12:
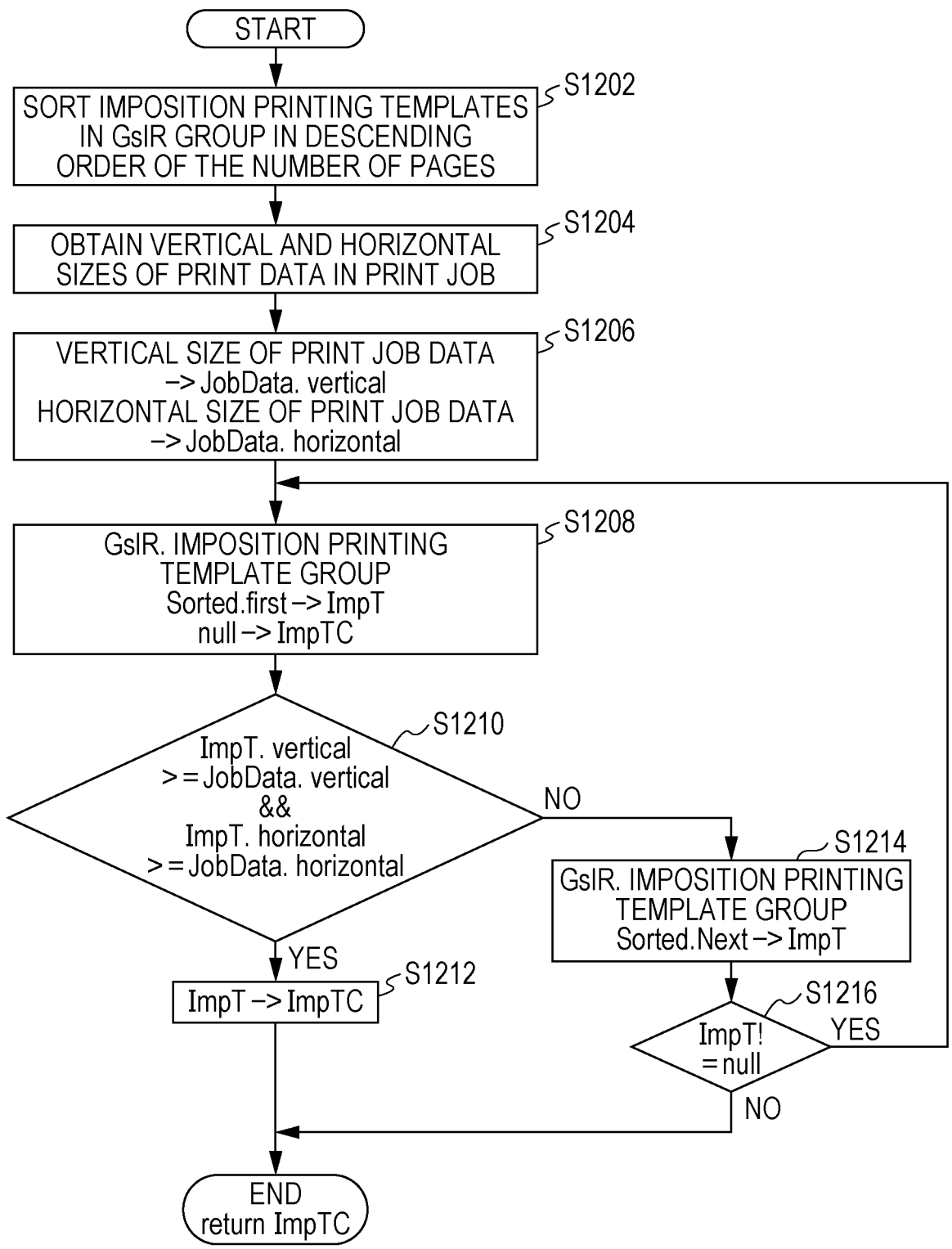
FIG. 12 is a flowchart illustrating an example of processing executed by the exemplary embodiment.

FIG. 12 is a flowchart illustrating an example of processing executed by the exemplary embodiment. More specifically, FIG. 12 illustrates details of an example of imposition-printing template selection processing of step S1014 in the flowchart of FIG. 10.

In step S1202, imposition printing templates included in the GslR group are sorted in descending order of the number of pages.

In step S1204, the vertical and horizontal sizes of data of the print job are obtained.

In step S1206, the vertical size of the print job data is input into a variable "JobData. vertical" and the horizontal size of the print job data is input into a variable "JobData. horizontal".

In step S1208, "Gr1R. imposition printing template group Sorted. first" is input into a variable ImpT, and "null" is input into a variable ImpTC.

In step S1210, it is judged whether "ImpT. vertical≥JobData. vertical" and "ImpT. horizontal≥JobData. horizontal". If the result of step S1210 is YES, the process proceeds to step S1212. If the result of step S1210 is NO, the process proceeds to step S1214.

In step S1212, the value of the variable ImpT is input into the variable ImpTC.

In step S1214, the value of a variable "GslR. imposition printing template group Sorted. Next" is input into the variable ImpT.

In step S1216, it is judged whether "ImpT !=null" (variable ImpT is not null). If the result of step S1216 is YES, the process returns to step S1208. If the result of step S1216 is NO, the processing is terminated. As a return value, the variable ImpTC is returned to step S1014 in the flowchart of FIG. 10.

Figure 13:
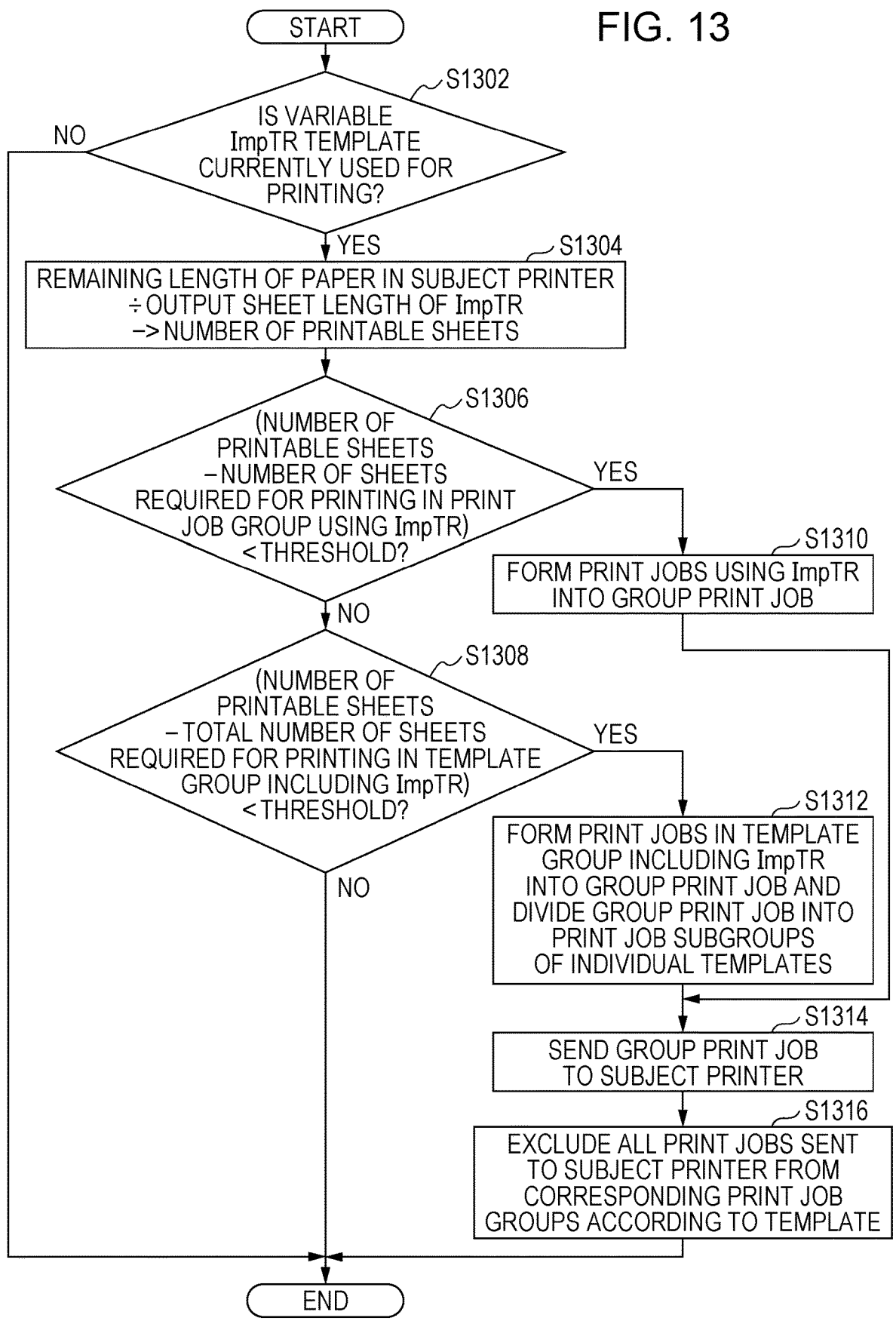
FIG. 13 is a flowchart illustrating an example of processing executed by the exemplary embodiment.

FIG. 13 is a flowchart illustrating an example of processing executed by the exemplary embodiment. More specifically, FIG. 13 illustrates details of an example of sending start judging processing of step S920 in the flowchart of FIG. 9.

In step S1302, it is judged whether the variable ImpTR is a template that can be currently used for printing. If ImpTR is a template currently used for printing, the process proceeds to step S1304. If ImpTR is not a template currently used for printing, the processing is terminated.

In step S1304, "the remaining length of paper in a subject printer÷the output sheet length of ImpTR" is set to be the number of printable sheets.

In step S1306, it is judged whether (the number of printable sheets−the number of sheets required for printing in the print job group using ImpTR) is smaller than a threshold. If the result of step S1306 is YES, the process proceeds to step S1310. If the result of step S1306 is NO, the process proceeds to step S1308.

In step S1308, it is judged whether (the number of printable sheets−the total number of sheets required for printing in the template group including ImpTR) is smaller than a threshold. If the result of step S1308 is YES, the process proceeds to step S1312. If the result of step S1308 is NO, the processing is terminated.

In step S1310, the print jobs using ImpTR are formed into a group print job. The process then proceeds to step S1314.

In step S1312, the print jobs included in the template group including ImpTR are formed into a group print job. This group print job is further divided into print job subgroups of the individual templates.

In step S1314, the group print job is sent to the subject printer.

In step S1316, all the print jobs sent to the subject printer are excluded from the corresponding print job groups according to the template.

Figure 14:
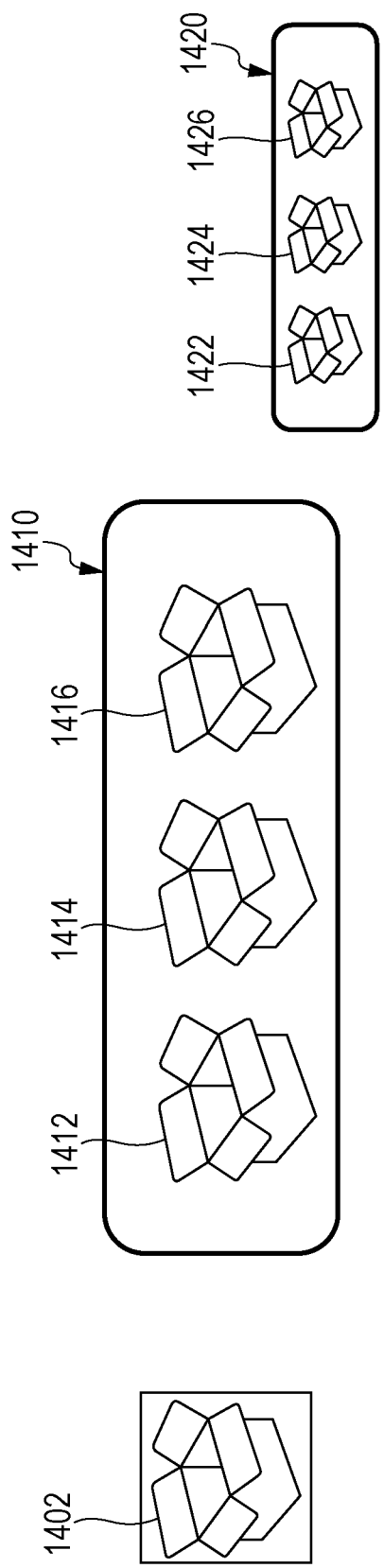
FIG. 14 illustrates an example of processing executed by the exemplary embodiment.

FIG. 14 illustrates an example of processing executed by the exemplary embodiment. More specifically, FIG. 14 illustrates examples of processing in steps S1002 and S1004.

A determination as to whether an imposition printing template is applicable to paper currently set in the printer 150 may be made in the following manner. The length and width of paper currently set in the printer 150 are compared with those of the output sheet of an imposition printing template. If one of the length and the width of a template is greater than that of paper set in the printer 150, such a template is not applicable to paper set in the printer 150. For example, a template 1402 is not applicable to the size of paper currently set in the printer 150. Templates 1412, 1414, 1416, 1422, 1424, and 1426 are applicable to paper currently set in the printer 150. This determination may be made by the printer 153 or by the information processing apparatus 100, which is a farther upstream system.

Among templates found to be applicable to paper set in the printer 150, templates having the same setting concerning the print side (single side or double sides) and the same output sheet length may be formed into a group of templates that can be used together at one time of printing operation.

For example, a template group 1410 includes the templates 1412, 1414, and 1416 having the same setting concerning the print side (single side) and having the same output sheet length (297 mm). A template group 1420 includes the templates 1422, 1424, and 1426 having the same setting concerning the print side (double sides) and having the same output sheet length (297 mm).

Figure 15:
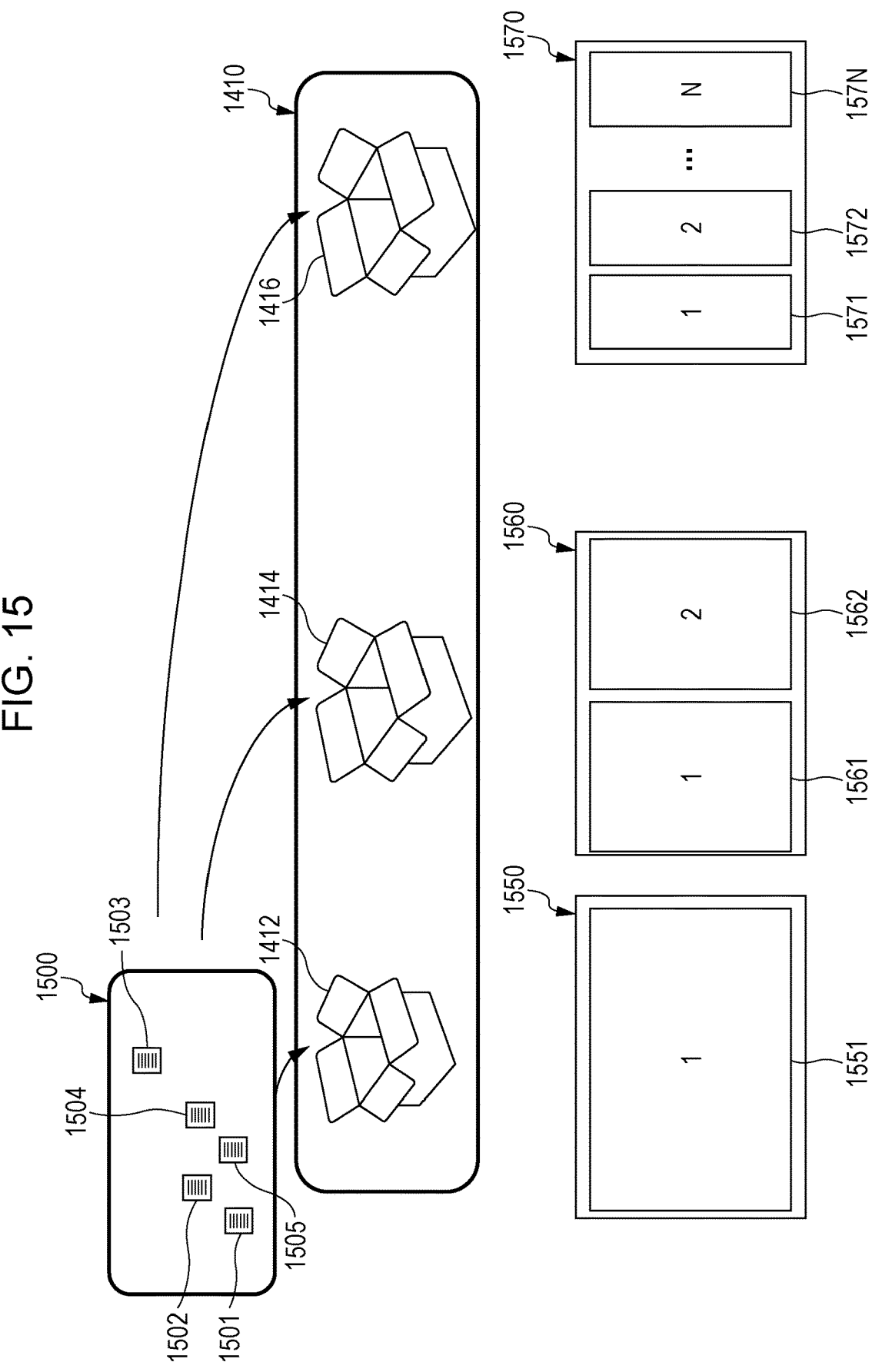
FIG. 15 illustrates an example of processing executed by the exemplary embodiment.

FIG. 15 illustrates an example of processing executed by the exemplary embodiment. More specifically, FIG. 15 illustrates an example of processing for allocating received print jobs.

Based on the print setting (single-sided or double-sided printing) and the page size of print data of a received print job group, a template group applicable to this print job group is identified among template groups having different output sheet lengths. Then, from this template group, a template on which each of the print jobs forming the print job group can be arranged most efficiently (a blank portion can be minimized) is selected.

A received print job group 1500 includes print jobs 1501 through 1505. These print jobs 1501 through 1505 concern single-sided printing and the vertical size of the page of print data is 297 mm or smaller. That is, the templates 1412, 1414, and 1416 included in the template group 1410 shown in FIG. 14 can be used.

The template 1412 is a one-page template corresponding to an output sheet 1550 having a page 1551. The template 1414 is a two-page template corresponding to an output sheet 1560 having two pages 1561 and 1562. The template 1416 is an N-page template corresponding to an output sheet 1570 having N pages 1571, 1572, . . . , and 157N.

An algorithm for determining a template group to which a print job is allocated will be explained below.

Step (S1) It is determined whether a print job requires single-sided or double-sided printing.

Step (S2) It is determined whether the output sheet length of each template group matches the page size of print data of a print job.

Step (S2) is executed for the template groups in descending order of the output sheet length, and when a template group satisfying the following conditions is found, it is determined that the print job will be allocated to this template group.

Conditions: (condition 1) and ((condition 2-1) or (condition 2-2))

(Condition 1) The print data size is smaller than or equal to the largest page of templates included in a subject template group.

(Condition 2-1) Another print job has already been allocated to a template within the subject template group.

(Condition 2-2) The value of (output sheet length−page length of print data) is 0 or greater and is almost 0 (a blank portion along the output sheet length is minimized).

Step (S3) For each of the templates included in the subject template group, the print data page size and the template page size are compared, and the template having the smallest difference (smallest blank portion) is selected as a template to be used for the print job.

Figure 16:
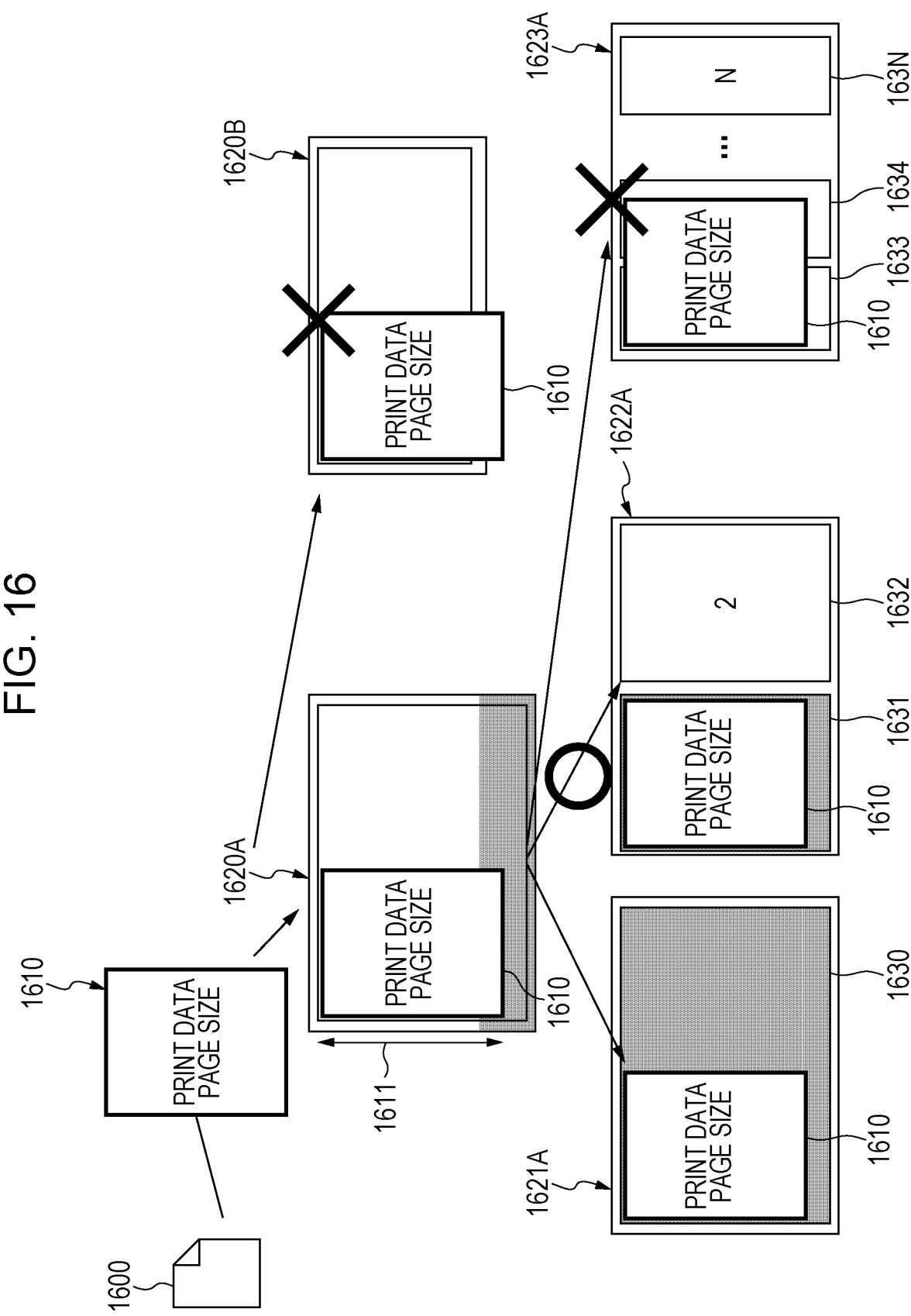
FIG. 16 illustrates an example of processing executed by the exemplary embodiment.

FIG. 16 illustrates an example of processing executed by the exemplary embodiment. More specifically, FIG. 16 is an illustration for explaining the above-described algorithm for determining a template group.

A template is selected based on the page size of print data of a print job and the sheet lengths and page sizes of templates, A print data page 1610 is extracted from print data 1600 of a print job.

A vertical page size 1611 of the print data page 1610 is smaller than or equal to the length of an output sheet 1620A (template group), and the size of the print data page 1610 thus fits the output sheet 1620A. In contrast, the vertical page size 1611 is larger than the length of an output sheet 1620B (template group), and the size of the print data page 1610 does not fit the output sheet 1620B. The output sheet 1620B is not selected as a template group for the print data page 1610.

The output sheet 1620A has three templates (output sheets 1621A, 1622A, and 1623A). The output sheet 1621A has one page 1630. The output sheet 1622A has two pages 1631 and 1632. The output sheet 1623A has N pages 1633, 1634, . . . , and 163N.

Although the size of the print data page 1610 fits the page 1630 of the output sheet 1621A, the blank portion becomes greater than that in the output sheet 1622A. The size of the print data page 1610 fits the page 1631 of the output sheet 1622A, and the blank portion in the output sheet 1622A is smaller than that in the output sheets 1621A and 1623A. The size of the print data page 1610 does not fit the page 1633 of the output sheet 1623A. The output sheet 1623A is not selected as a template for the print data page 1610.

The print job including the print data 1600 is thus allocated to the output sheet 1622A.

Figure 17:
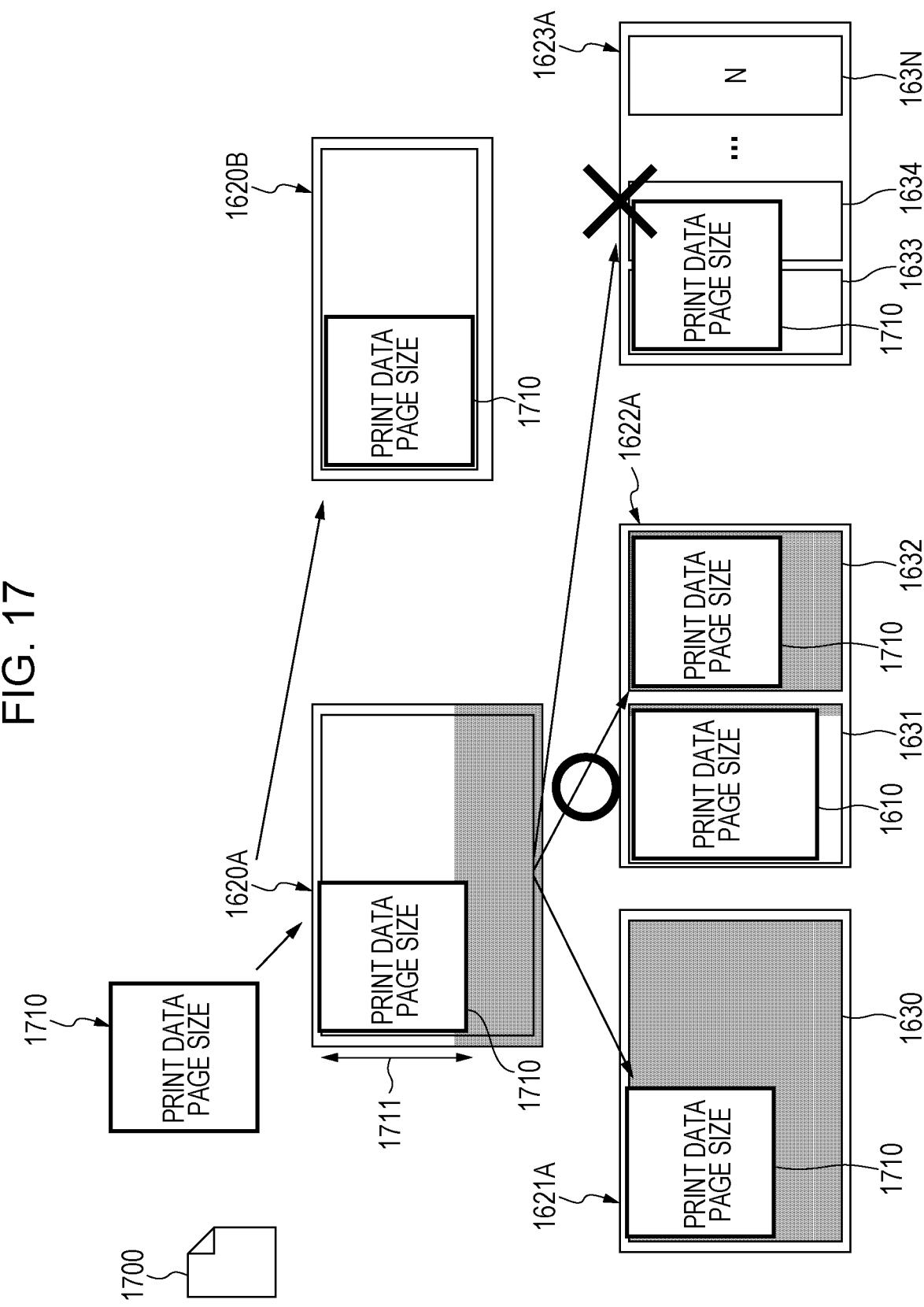
FIG. 17 illustrates an example of processing executed by the exemplary embodiment.

FIG. 17 illustrates an example of processing executed by the exemplary embodiment. More specifically, FIG. 17 is an illustration for explaining the above-described algorithm for determining a template group.

A template is selected based on the page size of print data of a print job and the sheet lengths and page sizes of templates, as in the example in FIG. 16. However, in the example in FIG. 17, another print job is already allocated to a template within a subject template group. That is, the state of processing in FIG. 17 is a state after processing in FIG. 16 has been executed.

A print data page 1710 is extracted from print data 1700 of a print job.

A vertical page size 1711 of the print data page 1710 is smaller than or equal to the length of the output sheet 1620A (template group), and the size of the print data page 1710 thus fits the output sheet 1620A. The vertical page size 1711 is also smaller than the length of the output sheet 1620B (template group), and the size of the print data page 1710 thus fits the output sheet 1620B. However, the print data page 1610 is already allocated to the output sheet 1620A.

Although the size of the print data page 1710 fits the page 1630 of the output sheet 1621A, the blank portion in the output sheet 1621A becomes greater than that in the output sheet 1622A. The size of the print data page 1710 fits the page 1632 of the output sheet 1622A, and the blank portion in the output sheet 1622A is smaller than that in the output sheets 1621A and 1623A. The size of the print data page 1710 does not fit the page 1633 of the output sheet 1623A. The output sheet 1623A is not selected as a template for the print data page 1710.

The print job including the print data 1700 is thus allocated to the output sheet 1622A.

FIGS. 18A through 18D illustrate an example of processing executed by the exemplary embodiment. More specifically, FIGS. 18A through 18D illustrate an example of processing for determining how many print jobs can be formed into a single group of print jobs.

The number of sheets required for printing print jobs allocated to each template is calculated.

This number of sheets is calculated by dividing the total number of pages of print jobs allocated to a template (the number of pages of print jobs×the number of print copies) by the number of pages of this template (rounding up to the closest whole number).

Figure 18A:
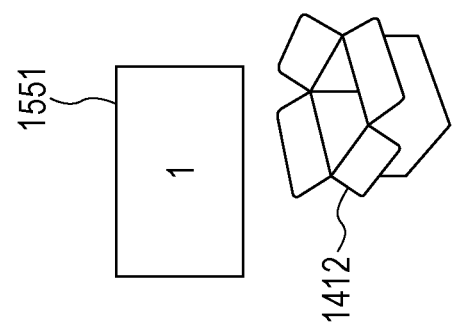
FIGS. 18A through 18D illustrate an example of processing executed by the exemplary embodiment.
Figure 18B:
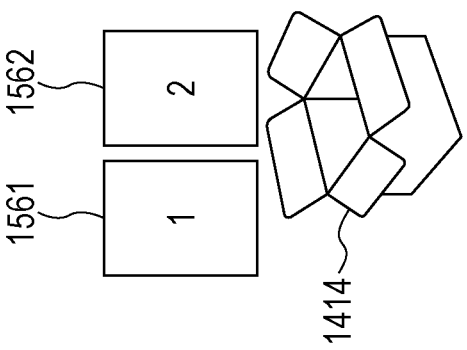
Figure 18C:
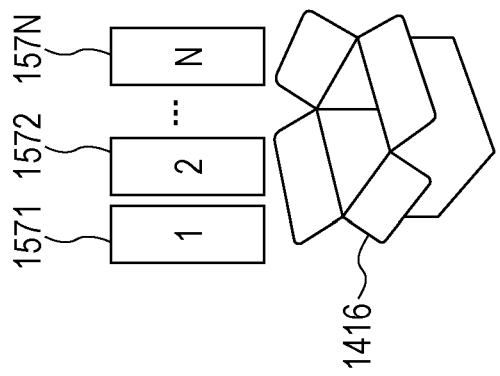

In the example of FIG. 18A, concerning print jobs allocated to the template 1412 (including the page 1551), the total number of pages is 3000 and the total number of sheets is 3000. This is because the output sheet 1550 (FIG. 15) has only one page (page 1551).

In the example of FIG. 18E, concerning print jobs allocated to the template 1414 (including the pages 1561 and 1562), the total number of pages is 2800 and the total number of sheets is 1400. This is because the output sheet 1560 (FIG. 15) has two pages (pages 1561 and 1562).

In the example of FIG. 18O, concerning print jobs allocated to the template 1416 (including the pages 1571, 1572, . . . , and 157N), the total number of pages is 2500 and the total number of sheets is RoundUp (2500/N). "RoundUp" is a function for rounding up to the closest whole number. This is because the output sheet 1570 (FIG. 15) has N pages (pages 1571, 1572, . . . , 157N).

Figure 18D:
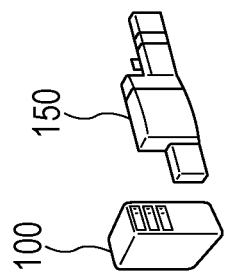

In the subject printer 150 shown in FIG. 18D, the remaining length of paper is 1500 m and the number of sheets that can be used for a template having a length of 297 mm is 5090.

Accordingly, if the condition (5050−(3000+1400+Roundup (2500/N))<threshold) is satisfied, the print jobs included in the template group are formed into a single group of print jobs. The threshold is 0 or greater.

FIG. 19 illustrates a display example of a print job table according to the exemplary embodiment.

The print job information display module 125 of the information processing apparatus 100 displays a print job table 1910, for example.

On a screen 1900, the print job table 1910 is displayed The print job table 1910 has an ID field 1911, a print job name field 1912, a status field 1913, a number-of-print-copies field 1914, a number-of-pages field 1915, a total-number-of-pages field 1916, a single-sided/double-sided printing field 1917, and a sending printer field 1918.

In the ID field 1911, information (ID) for uniquely identifying a print job in the exemplary embodiment is displayed. In the print job name field 1912, the name of the print job is displayed. In the status field 1913, the status of the print job is displayed. In the number-of-print-copies field 1914, the number of print copies in the print job is displayed. In the number-of-pages field 1915, the number of pages in the print job is displayed. In the total-number-of-pages field 1916, the total number of pages in the print job is displayed. In the single-sided/double-sided printing field 1917, information whether the print job requires single-sided or double-sided printing is displayed. In the sending printer field. 1918, the printer 150 to which the print job will be sent is displayed.

A group print job 1920 includes a print job group (five print jobs) 1925.

The five print jobs are sent to the printer 150 in order indicated by an arrow 1930 (from the top to the bottom). That is, the five print jobs in the print job group 1925 are printed in order indicated by the arrow 1930.

In the case of multi-page imposition printing, before print jobs in a print job group using the same template are sent, they may be separated from the group and cut-and-stack imposition data (see FIGS. 20A through 20C, for example) may be generated and sent. If the printer 150 has a cut-and-stack imposition function, the information processing apparatus 100 may omit this processing.

Figure 20A:
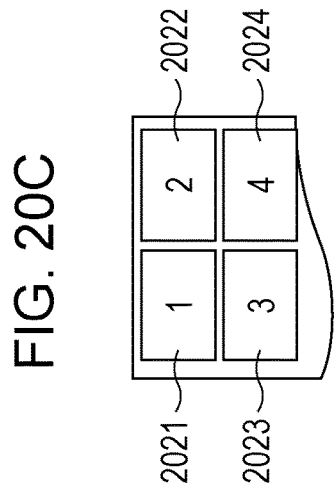
FIGS. 20A through 20C illustrate an example of processing executed by the exemplary embodiment.
Figure 20C:
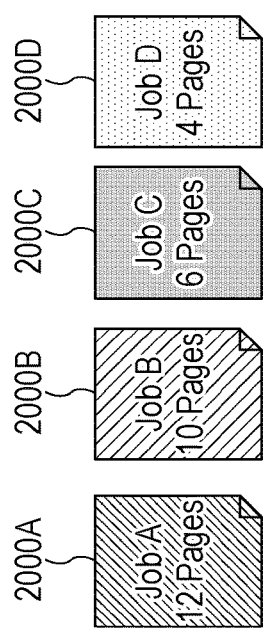
Figure 20B:
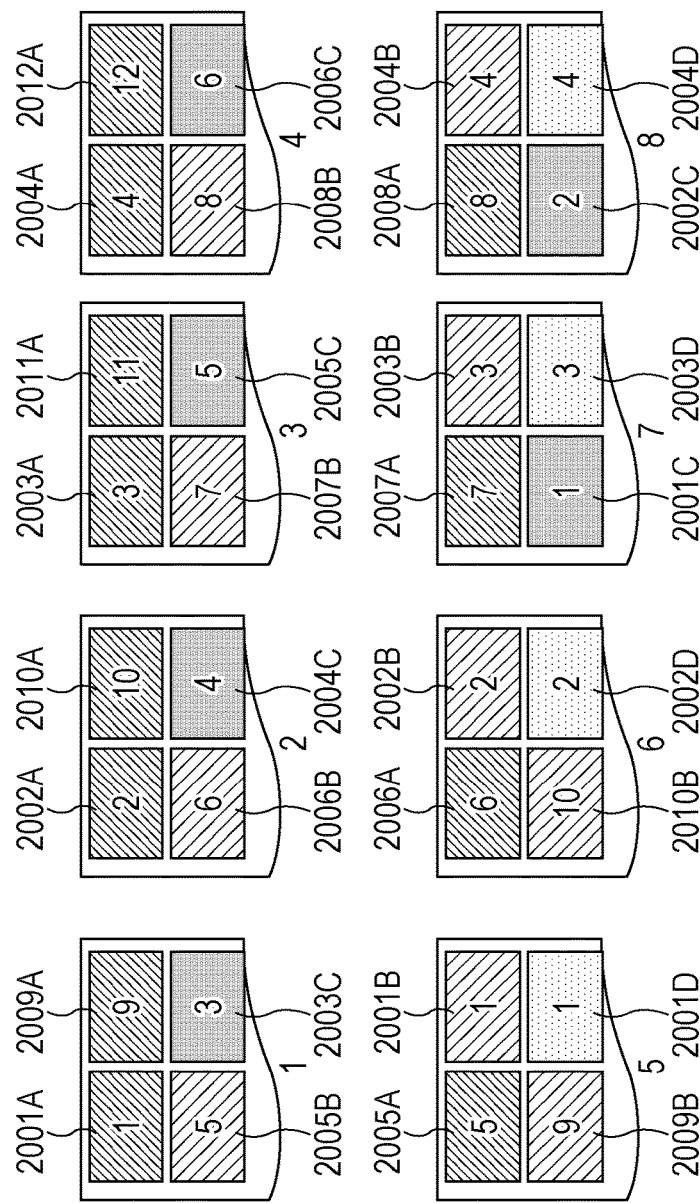

FIGS. 20A through 20C illustrate an example of processing executed by the exemplary embodiment. More specifically, FIGS. 20A through 20C illustrate an example of an algorithm for performing multi-page imposition printing for each group.

Step (A1) Print jobs within the same template are sorted in descending order of the total number of pages (the number of pages of a print job×the number of print copies). As shown in FIG. 20A, for example, a print job A 2000A having twelve pages, a print job B 2000B having ten pages, a print job C 2000C having six pages, and a print job D 2000D having four pages are sorted in this order.

Step (A2) The number of sheets (rounding up to the closest whole number) calculated by (the total number of pages in the same template÷the greatest number of pages in the template (rounding up to the closest whole number)) is assumed, and print jobs are arranged on the sheets in the sorting order of print jobs (cut-and-stack imposition). As shown in FIG. 20B, for example, eight sheets are assumed. Print jobs are arranged on the top left pages of the eight sheets in the sorting order, and then, print jobs are arranged on the top right pages of the eight sheets in the sorting order. Then, print jobs are arranged on the bottom left pages of the eight sheets in the sorting order, and print jobs are arranged on the bottom right pages of the eight sheets in the sorting order. As a result, as shown in FIG. 20B, on the first sheet (1), the first and ninth pages (pages 2001A and 2009A) of the print job A 2000A, the fifth page (page 2005B) of the print job B 2000B, and the third page (2003C) of the print job C 2000C are arranged. On the second sheet (2), the second and tenth pages (pages 2002A and 2010A) of the print job A 2000A, the sixth page (page 2006B) of the print job B 2000B, and the fourth page (2004C) of the print job C 2000C are arranged. On the third sheet (3), the third and eleventh pages (pages 2003A and 2011A) of the print job A 2000A, the seventh page (page 2007B) of the print job B 2000B, and the fifth page (2005C) of the print job C 2000C are arranged. On the fourth sheet (4), the fourth and twelfth pages (pages 2004A and 2012A) of the print job A 2000A, the eighth page (page 2008B) of the print job B 2000B, and the sixth page (2006C) of the print job C 2000C are arranged. On the fifth sheet (5), the fifth page (page 2005A) of the print job A 2000A, the first and ninth pages (pages 2001B and 2009B) of the print job B 2000B, and the first page (2001D) of the print job D 2000D are arranged. On the sixth sheet (6), the sixth page (page 2006A) of the print job A 2000A, the second and tenth pages (pages 2002B and 2010B) of the print job B 2000B, and the second page (2002D) of the print job D 2000D are arranged. On the seventh sheet (7), the seventh page (page 2007A) of the print job A 2000A, the third page (page 2003B) of the print job B 2000B, the first page (2001C) of the print job C 2000C, and the third page (2003D) of the print job D 2000D are arranged. On the eighth sheet (8), the eighth page (page 2008A) of the print job A 2000A, the fourth page (page 2004B) of the print job B 2000B, the second page (2002C) of the print job C 2000C, and the fourth page (2004D) of the print job D 2000D are arranged.

As a result of arranging the print jobs in this manner, as shown in FIG. 20C, after the printed sheets are cut in order of top left pages 2021, top right pages 2022, bottom left pages 2023, and bottom right pages 2024, a group of the top left pages 2021, a group of the top right pages 2022, a group of the bottom left pages 2023, and a group of the bottom right pages 2024 are stacked in this order. Then, printed matter 2030A, which is a printing result of the print job A, printed matter 2030B, which is a printing result of the print job B, printed matter 2030C, which is a printing result of the print job C, and printed matter 2030D, which is a printing result of the print job D, are generated.

FIGS. 21A and 21B illustrate an example of processing executed by the exemplary embodiment. More specifically, FIGS. 21A and 21B illustrate an example of processing derived from the above-described cut-and-stack imposition processing.

When forming a group print job for each template, a separator page for identifying the boundary between print jobs may be inserted before calculating the number of sheets and forming the print jobs into a group print job.

In the example of FIG. 21A, a print job X and a print job Y have been printed on paper 2100. Pages 2101X, 2102X, ..., 2110X, and 2101Y are printed on the paper 2100. In this example, a separator page is not inserted between the pages 2110X and 2101Y.

In the example of FIG. 21B, a print job A, a print job B, and a print job C have been printed on paper 2150. Pages 2151A, 2151B, 2152A, 2152B, ..., and 2160A, a separator page 2199, and pages 2161A, 2151C, ... are printed on the paper 2150. In this example, the separator page 2199 is inserted between the final page of the print job B and the first page of the print job C.

Figure 22:
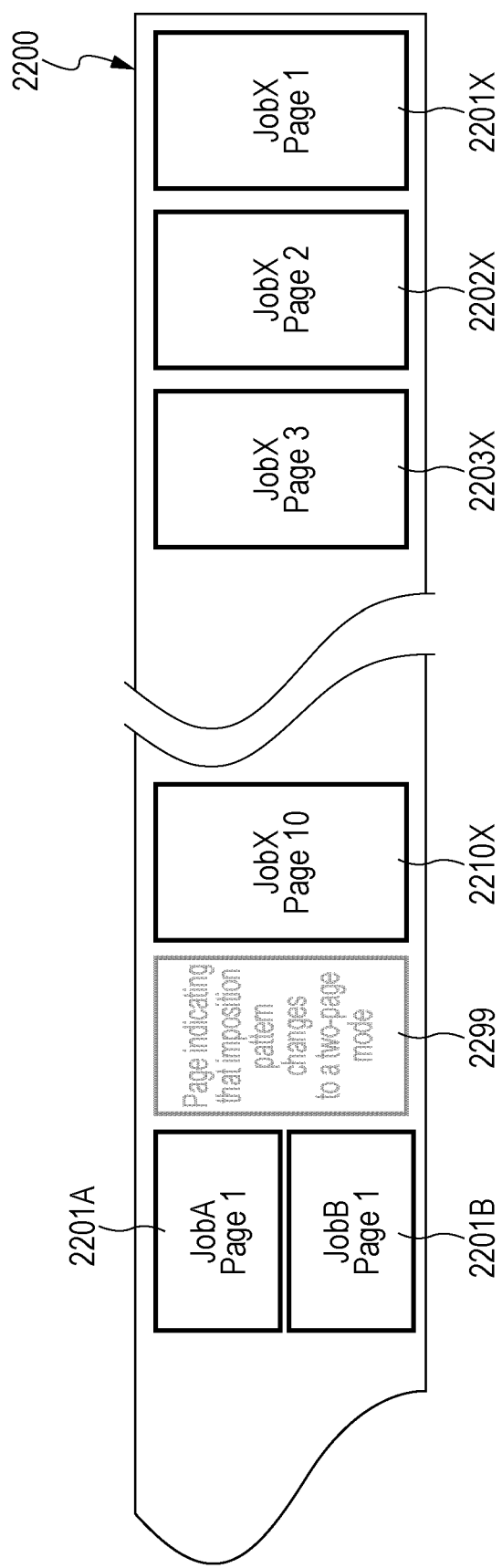
FIG. 22 illustrates an example of processing executed by the exemplary embodiment.

FIG. 22 illustrates an example of processing executed by the exemplary embodiment.

When forming a group print job by using plural templates that can be used together, a separator page for identifying the boundary between templates may be inserted before calculating the number of sheets and forming a group print job. This processing is derived from the above-described processing in FIG. 21B.

As shown in FIG. 22, for example, pages 2201X, 2202X, 2203X, ..., 2210X, a separator page 2299, and pages 2201A and 2201E are printed on paper 2200. In this example, the separator page 2299 is inserted between the final page of a print job X and the first page of a print job A (or print job B). That is, the separator page 2299 indicates that the cutting pattern (imposition pattern) changes after the separator page 2299. On the separator page 2299, an information image indicating that the imposition pattern changes to a two-page mode is printed. The information image is systematically generated image code to represent machine-readable digital data. Specific examples of the image information are linear barcode and two-dimensional barcode. In particular, quick response (QR) code (registered trademark) is being widely used as the two-dimensional barcode.

That is, on the separator page 2299, auxiliary print data is printed so that a cutter can detect a point at which the template is changed so as to switch the cutting pattern to be suitable for the template. As this auxiliary print data, an information image including embedded information representing the cutting pattern is used. The cutter reads this information image and changes the cutting pattern. The information processing apparatus 100 may generate the paper 2200 by inserting the separator page 2299 when forming a group print job.

A group of print jobs allocated to the same template may further be divided into subgroups according to the print job attribute (such as the paper type).

In this case, the number of sheets required for printing using a certain template is calculated for each subgroup, and the number of sheets required for printing using plural templates that can be used together is also calculated for each subgroup.

A determination as to whether a certain template can be currently used for printing may be made by comparing information obtained from the printer 150 (such as the type of paper currently set in the printer 150) with the print job attribute of a subgroup.

Figure 23:
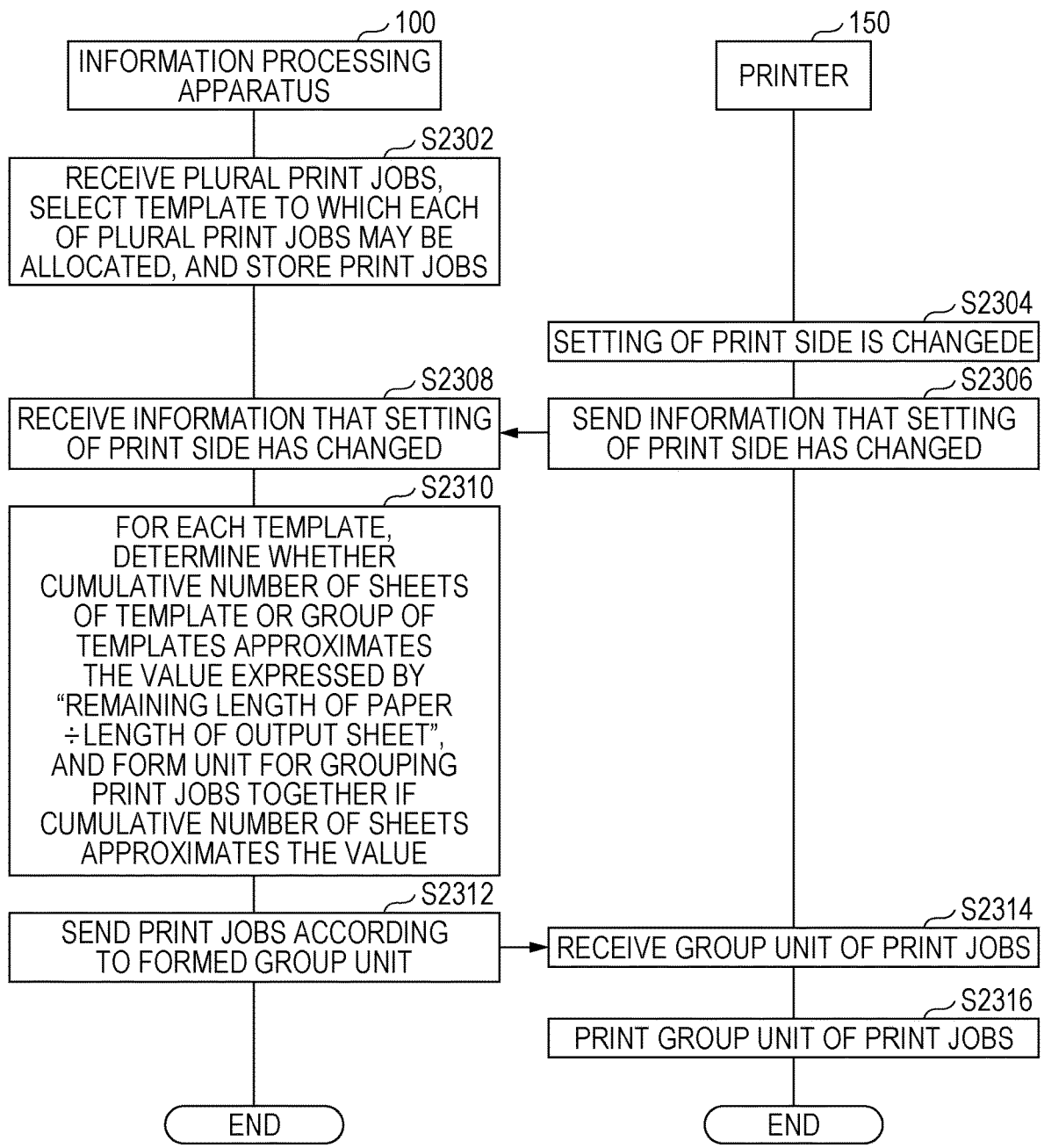
FIG. 23 is a flowchart illustrating an example of processing executed by the exemplary embodiment.

FIG. 23 is a flowchart illustrating an example of processing executed by the exemplary embodiment. More specifically, FIG. 23 illustrates an example of processing when the setting of the print side (single side or double sides) in the printer 150 is changed.

In step S2302, the information processing apparatus 100 receives plural print jobs, selects a template to which each of the plural print jobs may be allocated, and stores the print jobs.

In step S2304, in the printer 130, setting of the print side is changed. For example, as a result of a user operation, single-sided printing is changed to double-sided printing, or vice versa.

In step S2306, the printer 150 sends information concerning a change in the setting of the print side to the information processing apparatus 100.

In step S2308, the information processing apparatus 100 receives this information.

In step S2310, for each template, the information processing apparatus 100 determines whether the cumulative number of sheets of a template or a group of templates that can be used together approximates the value expressed by "the remaining length of paper÷the length of the output sheet". If the cumulative number of sheets approximates the above-described value, the information processing apparatus 100 starts to form a unit for grouping print jobs together.

In step S2312, the information processing apparatus 100 sends print jobs to the printer 150 according to the group unit formed in step S2310.

In step S2314, the printer 150 receives a group unit of print jobs from the information processing apparatus 100.

In step S2316, the printer 150 prints a group unit of print jobs.

Figure 24:
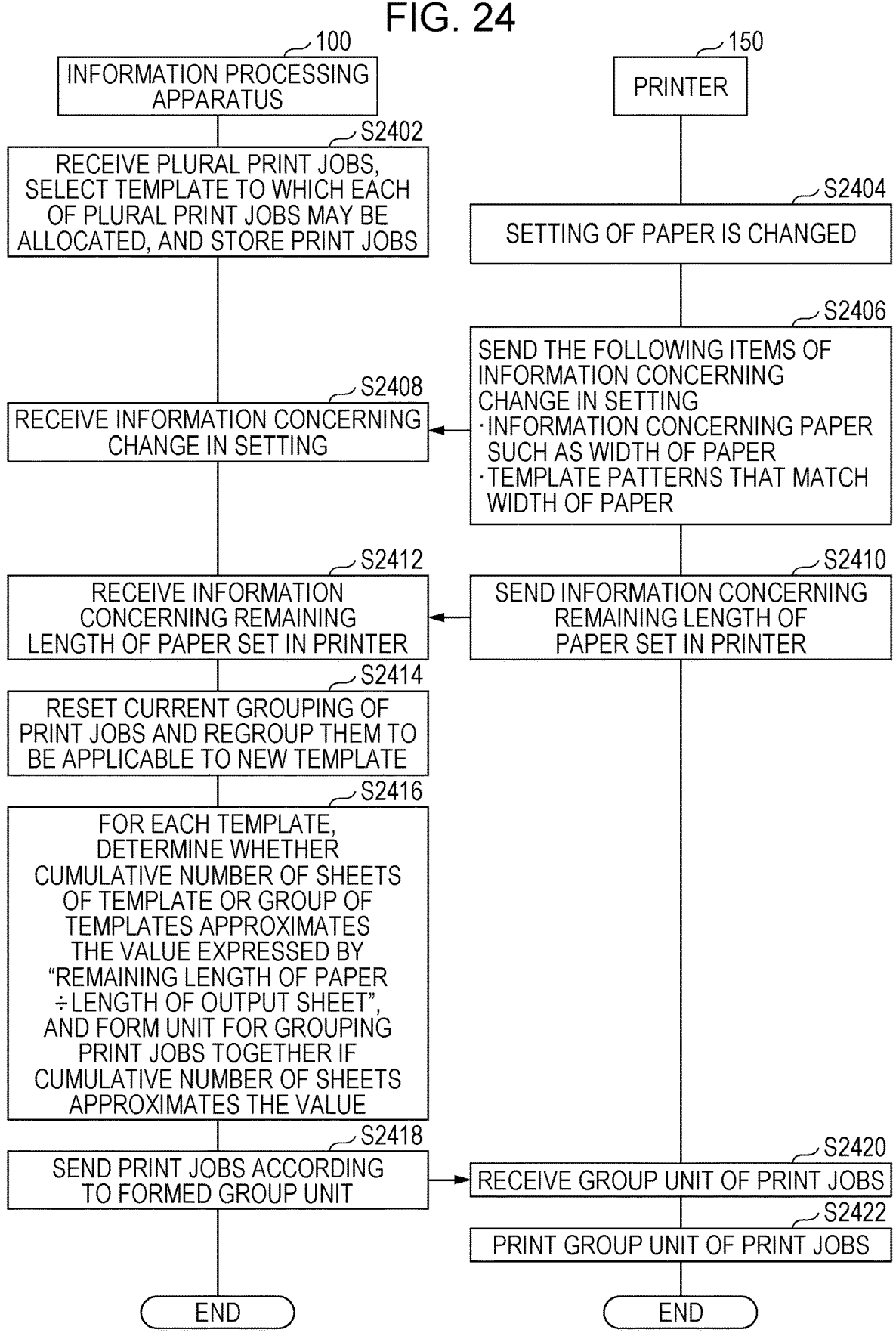
FIG. 24 is a flowchart illustrating an example of processing executed by the exemplary embodiment.

FIG. 24 is a flowchart illustrating an example of processing executed by the exemplary embodiment. More specifically, FIG. 24 illustrates an example of processing when paper type set in the printer 150 is changed. This processing does not occur frequently.

In step S2402, the information processing apparatus 100 receives plural print jobs, selects a template to which each of the plural print jobs may be allocated, and stores the print jobs.

In step S2404, in the printer 150, the paper type which makes it necessary to switch the applicable template is changed. For example, the operator replaces a bundle of paper having a certain width currently set in the printer 150 by another bundle of paper having a different width. This requires switching of the applicable template.

In step S2406, the printer 150 sends the following items of information concerning a change in the setting in the printer 150.

Information concerning a bundle of paper, such as the width of paper

Template patterns that match the width of paper

In step S2408, the information processing apparatus 100 receives the information from the printer 150.

In step S2410, the printer 150 ends information concerning the remaining length of paper set in the printer 150 to the information processing apparatus 100.

In step S2412, the information processing apparatus 100 receives this information.

In step S2414, when the information processing apparatus 100 has detected that the template group applicable to the printer 150 has changed, it resets current grouping of print jobs which have not been sent to the printer 150 and regroups print jobs to be applicable new template group.

In step S2416, for each template, the information processing apparatus 100 determines whether the cumulative number of sheets of a template or a group of templates that can be used together approximates the value expressed by "the remaining length of paper÷the length of the output sheet". If the cumulative number of sheets approximates the above-described value, the information processing apparatus 100 starts to form a unit for grouping print jobs together.

In step S2418, the information processing apparatus 100 sends print jobs to the printer 150 according to the group unit formed in step S2416.

In step S2420, the printer 150 receives a group unit of print jobs from the information processing apparatus 100.

Figure 25:
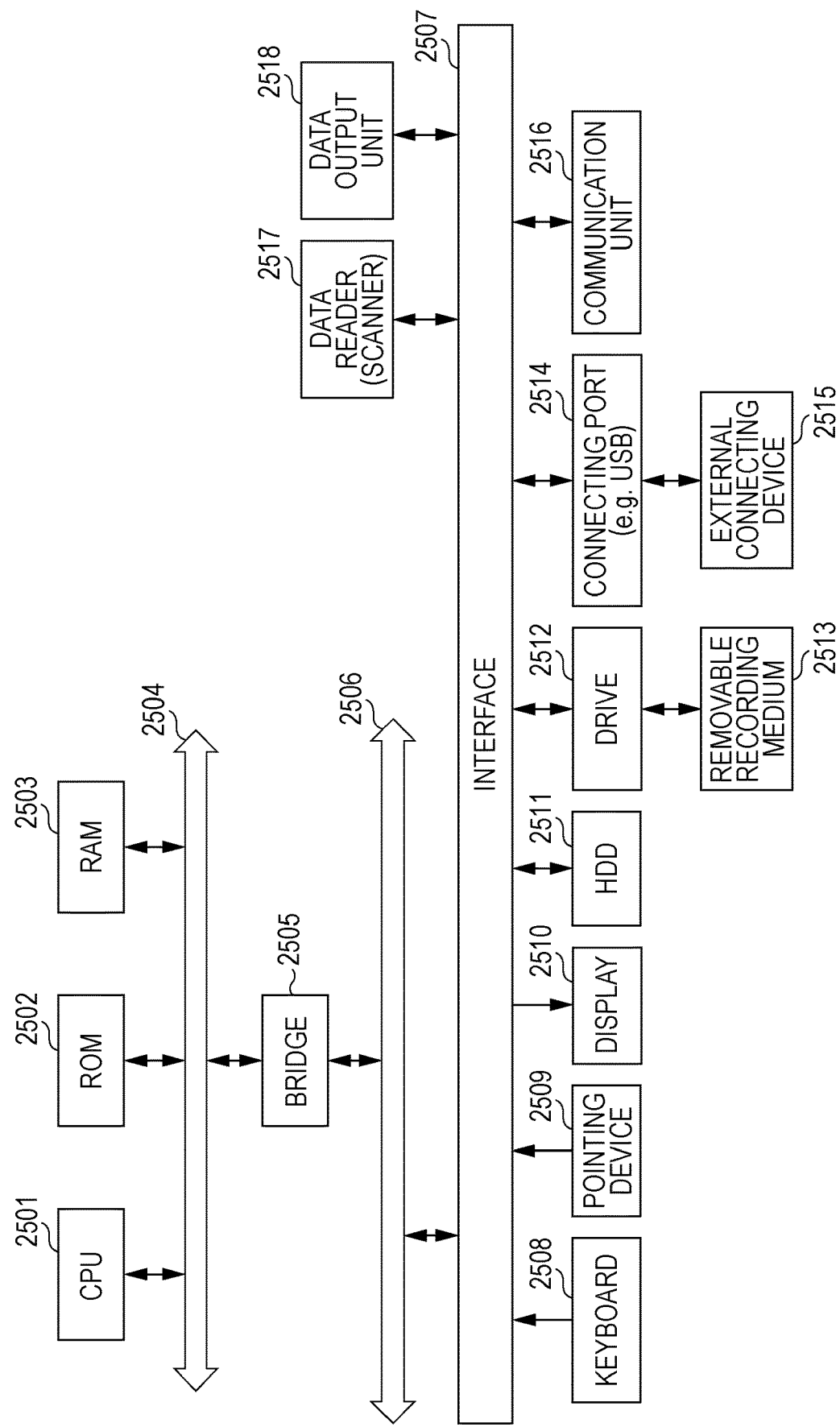
FIG. 25 is a block diagram illustrating an example of the hardware configuration of a computer implementing the exemplary embodiment.

In step S2422, the printer 150 prints a group unit of print jobs,

An example of the hardware configuration of the information processing apparatus 100 of the exemplary embodiment will be described below with reference to FIG. 25. The hardware configuration shown in FIG. 25 is implemented as a personal computer (PC), for example, and includes a data reader 2517, such as a scanner, and a data output unit 2518, such as a printer (printer 150).

A CPU 2501 is a control unit that executes processing in accordance with a computer program describing an execution sequence of the modules of the above-described exemplary embodiment, that is, the print job receiving module 105, the print job information analyzing module 110, the printer information obtaining module 120, the print job information display module 125, the imposition-printing template selecting module 130, the print job sending judging module 135, and the print job sending module 140.

A read only memory (ROM) 2502 stores programs and operation parameters used by the CPU 2501. A RAN 2503 stores programs used during the execution of the CPU 2501 and parameters which change appropriately during the execution of the programs. The CPU 2501, the ROM 2502, and the RAM 2503 are connected to one another via a host bus 2504, which is constituted by, for example, a CPU bus.

The host bus 2504 is connected to an external bus 2506, such as a peripheral component interconnect/interface (PCI) bus, via a bridge 2505.

A keyboard 2508 and a pointing device 2509, such as a mouse, are devices operated by an operator. A display 2510 is, for example, a liquid crystal display or a cathode ray tube (CRT), and displays various items of information as text or image information. Alternatively, a touchscreen having both of the functions of the pointing device 2509 and the display 2510 may be provided. In this case, to implement the function of the keyboard, a keyboard drawn on a screen (touchscreen) by using software, that is, a software keyboard or a screen keyboard, may be used instead of the keyboard 2508, which is a physical keyboard.

A hard disk drive (HDD) 2511 has a built-in hard disk (may alternatively be a flash memory, for example) and drives the hard disk so as to record or play back information or programs executed by the CPU 2501. The HDD 2511 implements the function of the DB 115, for example. Various other items of data and various other computer programs are also stored in the HDD 2511.

A drive 2512 reads data or a program recorded in a removable recording medium 2513, such as a magnetic disk, an optical disc, a magneto-optical disk, or a semiconductor memory, and supplies the read data or program to the RAM 2503 via an interface 2507, the external bus 2506, the bridge 2505, and the host bus 2504. The removable recording medium 2513 is also usable as a data recording region.

A connecting port 2514 is a port for connecting the PC to an external connecting device 2515, and has a connecting portion, such as a universal serial bus (USB) port or an IEEE1394 port. The connecting port 2514 is connected to, for example, the CPU 2501, via the interface 2507, the external bus 2506, the bridge 2505, and the host bus 2504. A communication unit 2516 is connected to a communication line and executes data communication processing with an external source. The data reader 2517 is, for example, a scanner, and executes processing for reading documents. The data output unit 251 is, for example, a printer, and executes processing for outputting document data.

The hardware configuration of the information processing apparatus 100 shown in FIG. 25 is only an example, and the exemplary embodiment may be configured in any manner in which the modules described in the exemplary embodiment are executable. For example, some modules may be configured as dedicated hardware (for example, an application specific integrated circuit (ASIC)), or some modules may be installed in an external system and be connected to the PC via a communication line. A system, such as that shown in FIG. 25, may be connected to a system, such as that shown in FIG. 25, via a communication line, and may be operated in cooperation with each other. Additionally, instead of into a PC, the modules may be integrated into a mobile information communication device (including a cellular phone, a smartphone, a mobile device, and a wearable computer), a home information appliance, a robot, a copying machine, a fax machine, a scanner, a printer, and a multifunction device (image processing device including at least two functions among a scanner, a printer, a copying machine, and a fax machine).

The above-described program may be stored in a recording medium and be provided. The program recorded on a recording medium may be provided via a communication medium. In this case, the above-described program may be implemented as a "non-transitory computer readable medium storing the program therein" in the exemplary embodiment.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a CD read only memory (CD-ROM), a CD recordable (CD-R), and a CD rewritable (CD-RW), Blu-ray (registered trademark) disc, a magneto-optical disk (MO), a flexible disk (FD), magnetic tape, a hard disk, a ROM, an electrically erasable programmable read only memory (EEPROM) (registered trademark), a flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be the entirety or part of another program, or may be recorded, together with another program, on a recording medium. The program may be divided and recorded on plural recording media. The program may be recorded in any form, for example, it may be compressed or encrypted, as long as it can be reconstructed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor programmed to:
receive a plurality of print jobs and that select, from among templates applicable to a printer, a template to which each of the plurality of print jobs is allocated in accordance with a paper size specified in a corresponding print job and a size of continuous-form paper set in the printer, wherein
the templates are divided into template groups in accordance with a width of continuous-form paper, a sheet size in a print direction set in each template, and whether each template is used for single-sided or double-sided printing;
allocate the plurality of print jobs to the corresponding selected templates, integrate some of the print jobs together, and then send an integrated print job to the printer; and
select a template group suitable for the width of continuous-form paper set in the printer and the paper size specified in a corresponding print job and in accordance with whether single-sided or double-sided printing is specified in the corresponding print job.

2. The information processing apparatus according to claim 1, wherein the processor is programmed to select a template group based on a condition that the paper size is smaller than or equal to a largest size of pages of templates within a template group.

3. The information processing apparatus according to claim 2, wherein the processor is programmed to select a template group based on a condition that another print job is already allocated to a template within a template group.

4. The information processing apparatus according to claim 3, wherein the processor is programmed to compare the paper size with a page size of each of the templates within the selected template group, and select a template within which a blank portion will be smaller than blank portions of the other templates.

5. The information processing apparatus according to claim 2, wherein the processor is programmed to select a template group based on a condition that a value obtained by subtracting a length of the paper size from a length of the sheet size in the print direction is 0 or greater and is almost 0.

6. The information processing apparatus according to claim 5, wherein the processor is programmed to compare the paper size with a page size of each of the templates within the selected template group, and select a template within which a blank portion will be smaller than blank portions of the other templates.

7. The information processing apparatus according to claim 1, wherein the processor is programmed to allocate the plurality of print jobs to the corresponding selected templates so that an amount of continuous-form paper which remains as a result of printing the print jobs will be smaller than or smaller than or equal to a predetermined value, integrate some of the print jobs together, and send an integrated print job to the printer.

8. The information processing apparatus according to claim 7, wherein,
for each of the print jobs to be allocated to a corresponding selected template, the processor is programmed to calculate the number of sheets set in the selected template required for printing a corresponding print job, and compare a total number of sheets required for printing a plurality of print jobs in the selected template with the number of printable sheets corresponding to a remaining amount of continuous-form paper set in the printer, and if a difference between the total number of sheets in the selected template and the number of printable sheets is smaller than or smaller than or equal to a predetermined value, the processor is programmed to allocate the print jobs to the selected template, integrate the print jobs together, and send an integrated print job to the printer.

9. A non-transitory computer readable medium storing a program causing a computer to execute a process, the process comprising:
receiving a plurality of print jobs and selecting, from among templates applicable to a printer, a template to which each of the plurality of print jobs is allocated in accordance with a paper size specified in a corresponding print job and a size of continuous-form paper set in the printer, wherein
the templates are divided into template groups in accordance with a width of continuous-form paper, a sheet size in a print direction set in each template, and whether each template is used for single-sided or double-sided printing;
allocating the plurality of print jobs to the corresponding selected templates, integrating some of the print jobs together, and then sending an integrated print job to the printer; and
selecting a template group suitable for the width of continuous-form paper set in the printer and the paper size specified in a corresponding print job and in accordance with whether single-sided or double-sided printing is specified in the corresponding print job.

10. The non-transitory computer readable medium according to claim 9, wherein, after the plurality of print jobs are allocated to the corresponding selected templates, some of the print jobs are integrated together by using a single template or a group of templates which are usable together and are sent to the printer.

11. An information processing apparatus comprising:
selecting means for receiving a plurality of print jobs and for selecting, from among templates applicable to a printer, a template to which each of the plurality of print jobs is allocated in accordance with a paper size specified in a corresponding print job and a size of continuous-form paper set in the printer, wherein
the templates are divided into template groups in accordance with a width of continuous-form paper, a sheet size in a print direction set in each template, and whether each template is used for single-sided or double-sided printing;

sending means for allocating the plurality of print jobs to the corresponding templates selected by the selecting means, integrating some of the print jobs together, and then sending an integrated print job to the printer; and selecting means for selecting a template group suitable for the width of continuous-form paper set in the printer and the paper size specified in a corresponding print job and in accordance with whether single-sided or double-sided printing is specified in the corresponding print job.

* * * * *